United States Patent [19]
Katz

[11] Patent Number: 5,917,893
[45] Date of Patent: *Jun. 29, 1999

[54] MULTIPLE FORMAT TELEPHONIC INTERFACE CONTROL SYSTEM

[75] Inventor: Ronald A. Katz, Los Angeles, Calif.

[73] Assignee: Ronald A. Katz Technology Licensing, L.P., Beverly Hills, Calif.

[ * ] Notice: This patent is subject to a terminal disclaimer.

[21] Appl. No.: 08/485,113

[22] Filed: Jun. 7, 1995

Related U.S. Application Data

[63] Continuation of application No. 08/306,751, Sep. 14, 1994, which is a continuation of application No. 08/047,241, Apr. 13, 1993, Pat. No. 5,351,285, which is a continuation of application No. 07/509,691, Apr. 16, 1990, abandoned, which is a continuation-in-part of application No. 07/260,104, Oct. 20, 1988, Pat. No. 4,930,150, which is a continuation-in-part of application No. 07/018,244, Feb. 24, 1987, Pat. No. 4,792,968, which is a continuation-in-part of application No. 06/753,299, Jul. 10, 1985, abandoned, which is a continuation-in-part of application No. 07/640,337, Jan. 11, 1991, abandoned, which is a continuation of application No. 07/335,923, Apr. 10, 1989, which is a continuation of application No. 07/194,258, May 16, 1988, Pat. No. 4,845,739.

[51] Int. Cl.⁶ .................................................. H04M 11/00
[52] U.S. Cl. ................................... 379/93.02; 379/93.12; 379/93.13; 379/92.03
[58] Field of Search ................................. 379/92, 95, 97, 379/96, 94, 93, 91, 142, 88, 89, 91.01, 91.02, 92.01, 92.03, 93.02, 93.12, 93.13

[56] References Cited

U.S. PATENT DOCUMENTS 2,902,541  9/1959  Singleton .
2,941,161  6/1960  Scantlin .
3,060,275  10/1962  Meacham et al. .

(List continued on next page.)

FOREIGN PATENT DOCUMENTS

66113/81  7/1981  Australia .
1022674  12/1977  Canada .
1025118  1/1978  Canada .

(List continued on next page.)

OTHER PUBLICATIONS

Lexis Search Results (Great American Potato–Chip giveaway/Raisin Bran Game/Giants Baseball Trivia—Dial Info):
"In The Chips" AdWeek, Jul. 22, 1985.
"San–Fran–Police–League", Business Wire, Aug. 2, 1985.
"Similar Campaigns", DM News, Dec. 15, 1985.
"Phone Offers Action At Push Of Button", Advertising Age, Feb. 6, 1986.
Boies, Stephen J., "A Computer Based Audio Communication System", *Computer Sciences Department*, Thomas J. Watson Research Center, Yorktown Heights, New York, USA, pp. 701–704—(Article) (Undated).

(List continued on next page.)

*Primary Examiner*—Stella Woo
*Attorney, Agent, or Firm*—Lyon & Lyon LLP

[57] ABSTRACT

Call data signals actuated by a telephone terminal are provided from a telephone communication system to indicate call data as the called number, the calling number and the calling equipment. The call data signals address related control functions for selectively interfacing a live operator terminal or a multiple format multiple port data processing system. The interface connection involves providing a specific format as for automated processing or to prompt an operator. Screening tests and format selection are performed to make a determination. Individual telephone terminals and individual data formats are arranged and interfaced under controlled conditions specified by the call data. Time tests, history tests and demographic tests may be executed in addition to basic selection and qualification tests. Control may be executed from active data storage for assembled control words and record words. Record words for individual calls may be stored along with developed data.

89 Claims, 5 Drawing Sheets

U.S. PATENT DOCUMENTS

| | | |
|---|---|---|
| 3,076,059 | 1/1963 | Meacham et al. . |
| 3,082,402 | 3/1963 | Scantlin . |
| 3,128,349 | 4/1964 | Boesch et al. . |
| 3,159,818 | 12/1964 | Scantlin . |
| 3,246,082 | 4/1966 | Levy . |
| 3,249,919 | 5/1966 | Scantlin . |
| 3,299,210 | 1/1967 | Bandy . |
| 3,337,847 | 8/1967 | Olsson et al. . |
| 3,347,988 | 10/1967 | Marill et al. . |
| 3,371,162 | 2/1968 | Scantlin . |
| 3,381,276 | 4/1968 | James . |
| 3,393,272 | 7/1968 | Hanson . |
| 3,394,246 | 7/1968 | Goldman . |
| 3,482,057 | 12/1969 | Abbott et al. . |
| 3,515,814 | 6/1970 | Morgan . |
| 3,544,769 | 12/1970 | Hedin . |
| 3,556,530 | 1/1971 | Barr . |
| 3,557,311 | 1/1971 | Goldstein . |
| 3,568,157 | 3/1971 | Downing et al. . |
| 3,569,939 | 3/1971 | Doblmaier et al. . |
| 3,571,799 | 3/1971 | Coker, Jr. et al. . |
| 3,573,747 | 4/1971 | Adams et al. . |
| 3,581,072 | 5/1971 | Nymeyer . |
| 3,594,004 | 7/1971 | Barr . |
| 3,617,638 | 11/1971 | Jochimsen et al. . |
| 3,618,038 | 11/1971 | Stein . |
| 3,624,292 | 11/1971 | Guzak, Jr. . |
| 3,644,675 | 2/1972 | Waltington . |
| 3,647,973 | 3/1972 | James et al. . |
| 3,651,480 | 3/1972 | Downing et al. . |
| 3,656,113 | 4/1972 | Lince . |
| 3,665,107 | 5/1972 | Kopec et al. . |
| 3,675,513 | 7/1972 | Flanagan et al. . |
| 3,688,126 | 8/1972 | Klein . |
| 3,696,335 | 10/1972 | Lemelson . |
| 3,697,702 | 10/1972 | Buonsante et al. . |
| 3,781,810 | 12/1973 | Downing . |
| 3,792,446 | 2/1974 | McFiggins et al. . |
| 3,794,774 | 2/1974 | Kemmerly et al. . |
| 3,800,283 | 3/1974 | Gropper . |
| 3,858,032 | 12/1974 | Scantlin . |
| 3,870,821 | 3/1975 | Steury . |
| 3,881,160 | 4/1975 | Ross . |
| 3,889,050 | 6/1975 | Thompson . |
| 3,909,553 | 9/1975 | Marshall . |
| 3,912,874 | 10/1975 | Botterell et al. . |
| 3,914,747 | 10/1975 | Barnes et al. . |
| 3,918,174 | 11/1975 | Miller et al. . |
| 3,920,908 | 11/1975 | Kraus . |
| 3,928,724 | 12/1975 | Byram et al. . |
| 3,934,095 | 1/1976 | Matthews et al. . |
| 3,947,972 | 4/1976 | Freeman . |
| 3,950,618 | 4/1976 | Bloisi . |
| 3,974,338 | 8/1976 | Luzier et al. . |
| 3,982,103 | 9/1976 | Goldman . |
| 3,989,899 | 11/1976 | Norwich . |
| 3,991,406 | 11/1976 | Downing et al. . |
| 3,998,465 | 12/1976 | Mascola . |
| 4,009,342 | 2/1977 | Fahrenschon et al. . |
| 4,012,599 | 3/1977 | Meyer . |
| 4,017,835 | 4/1977 | Randolph . |
| 4,024,345 | 5/1977 | Kochem . |
| 4,054,756 | 10/1977 | Comella et al. . |
| 4,071,698 | 1/1978 | Barger, Jr. et al. ................ 379/92 |
| 4,078,316 | 3/1978 | Freeman . |
| 4,088,838 | 5/1978 | Nakata et al. . |
| 4,090,038 | 5/1978 | Biggs . |
| 4,108,361 | 8/1978 | Krause . |
| 4,117,278 | 9/1978 | Ehrlich et al. . |
| 4,121,052 | 10/1978 | Richard . |
| 4,145,578 | 3/1979 | Orriss . |
| 4,150,255 | 4/1979 | Theis et al. . |
| 4,152,547 | 5/1979 | Theis . |
| 4,160,125 | 7/1979 | Bower et al. . |
| 4,162,377 | 7/1979 | Mearns . |
| 4,187,498 | 2/1980 | Creekmore . |
| 4,191,376 | 3/1980 | Goldman . |
| 4,191,860 | 3/1980 | Weber . |
| 4,194,089 | 3/1980 | Hashimoto . |
| 4,200,770 | 4/1980 | Hellman et al. . |
| 4,201,887 | 5/1980 | Burns . |
| 4,223,183 | 9/1980 | Peters, Jr. . |
| 4,232,199 | 11/1980 | Boatwright et al. . |
| 4,241,942 | 12/1980 | Bachman . |
| 4,242,539 | 12/1980 | Hashimoto . |
| 4,243,844 | 1/1981 | Waldman . |
| 4,255,618 | 3/1981 | Danner et al. . |
| 4,260,854 | 4/1981 | Kolodny et al. . |
| 4,264,924 | 4/1981 | Freeman . |
| 4,264,925 | 4/1981 | Freeman et al. . |
| 4,270,024 | 5/1981 | Theis et al. . |
| 4,277,649 | 7/1981 | Sheinbein . |
| 4,290,141 | 9/1981 | Anderson et al. . |
| 4,299,637 | 11/1981 | Oberdeck et al. . |
| 4,302,810 | 11/1981 | Bouricius et al. . |
| 4,303,804 | 12/1981 | Johnson et al. . |
| 4,307,266 | 12/1981 | Messina . |
| 4,314,103 | 2/1982 | Wilson . |
| 4,317,961 | 3/1982 | Johnson . |
| 4,320,256 | 3/1982 | Freeman . |
| 4,323,770 | 4/1982 | Dieulot et al. . |
| 4,328,396 | 5/1982 | Theis . |
| 4,338,494 | 7/1982 | Theis . |
| 4,339,798 | 7/1982 | Hedges et al. . |
| 4,345,315 | 8/1982 | Cadotte et al. . |
| 4,348,554 | 9/1982 | Asmuth . |
| 4,355,207 | 10/1982 | Curtin . |
| 4,355,372 | 10/1982 | Johnson et al. . |
| 4,360,827 | 11/1982 | Braun . |
| 4,371,752 | 2/1983 | Matthews et al. . |
| 4,376,875 | 3/1983 | Beirne . |
| 4,389,546 | 6/1983 | Glisson et al. . |
| 4,393,277 | 7/1983 | Besen et al. . |
| 4,398,708 | 8/1983 | Goldman et al. . |
| 4,405,829 | 9/1983 | Rivest et al. . |
| 4,420,656 | 12/1983 | Freeman . |
| 4,427,848 | 1/1984 | Tsakanikas . |
| 4,439,635 | 3/1984 | Theis et al. . |
| 4,439,636 | 3/1984 | Newkirk et al. . |
| 4,451,087 | 5/1984 | Comstock . |
| 4,451,700 | 5/1984 | Kempner et al. . |
| 4,468,528 | 8/1984 | Reece et al. . |
| 4,475,189 | 10/1984 | Herr et al. . |
| 4,489,438 | 12/1984 | Hughes . |
| 4,490,583 | 12/1984 | Bednarz et al. . |
| 4,494,197 | 1/1985 | Troy et al. . |
| 4,511,764 | 4/1985 | Nakayama et al. . |
| 4,517,410 | 5/1985 | Williams et al. . |
| 4,518,827 | 5/1985 | Sagara . |
| 4,521,643 | 6/1985 | Dupuis et al. . |
| 4,523,055 | 6/1985 | Hohl et al. . |
| 4,532,378 | 7/1985 | Nakayama et al. . |
| 4,539,435 | 9/1985 | Eckmann . |
| 4,539,436 | 9/1985 | Theis . |
| 4,544,804 | 10/1985 | Herr et al. . |
| 4,547,851 | 10/1985 | Kurland . |
| 4,549,047 | 10/1985 | Brian et al. . |
| 4,555,594 | 11/1985 | Friedes et al. . |
| 4,559,415 | 12/1985 | Bernard et al. . |
| 4,559,416 | 12/1985 | Theis et al. . |
| 4,562,342 | 12/1985 | Solo . |
| 4,566,030 | 1/1986 | Nickerson et al. . |

| | | |
|---|---|---|
| 4,567,359 | 1/1986 | Lockwood . |
| 4,570,930 | 2/1986 | Matheson . |
| 4,577,062 | 3/1986 | Hilleary et al. . |
| 4,577,067 | 3/1986 | Levy et al. . |
| 4,578,700 | 3/1986 | Roberts et al. . |
| 4,580,012 | 4/1986 | Matthews et al. . |
| 4,582,956 | 4/1986 | Doughty . |
| 4,584,602 | 4/1986 | Nakagawa . |
| 4,585,906 | 4/1986 | Matthews et al. . |
| 4,586,707 | 5/1986 | McNeight et al. . |
| 4,587,379 | 5/1986 | Masuda . |
| 4,591,190 | 5/1986 | Clark . |
| 4,591,664 | 5/1986 | Freeman . |
| 4,592,546 | 6/1986 | Fascenda et al. . |
| 4,594,476 | 6/1986 | Freeman . |
| 4,598,367 | 7/1986 | DeFrancesco et al. . |
| 4,603,232 | 7/1986 | Kurland et al. . |
| 4,611,094 | 9/1986 | Asmuth et al. . |
| 4,614,367 | 9/1986 | Breen . |
| 4,625,079 | 11/1986 | Castro et al. . |
| 4,625,276 | 11/1986 | Benton et al. . |
| 4,630,200 | 12/1986 | Ohmae et al. . |
| 4,630,201 | 12/1986 | White . |
| 4,634,809 | 1/1987 | Paulsson et al. . |
| 4,635,251 | 1/1987 | Stanley et al. . |
| 4,645,873 | 2/1987 | Chomet . |
| 4,649,563 | 3/1987 | Riskin . |
| 4,652,998 | 3/1987 | Koza . |
| 4,654,482 | 3/1987 | DeAngelis . |
| 4,658,417 | 4/1987 | Hashimoto et al. . |
| 4,663,777 | 5/1987 | Szeto . |
| 4,665,502 | 5/1987 | Kreisner . |
| 4,669,730 | 6/1987 | Small . |
| 4,671,512 | 6/1987 | Bachman et al. . |
| 4,674,044 | 6/1987 | Kalmus et al. . |
| 4,677,552 | 6/1987 | Sibley, Jr. . |
| 4,677,553 | 6/1987 | Roberts et al. . |
| 4,685,123 | 8/1987 | Hsia et al. . |
| 4,688,170 | 8/1987 | Waite et al. . |
| 4,692,817 | 9/1987 | Theis . |
| 4,694,490 | 9/1987 | Harvey et al. . |
| 4,696,028 | 9/1987 | Morganstein et al. . |
| 4,696,029 | 9/1987 | Cohen . |
| 4,697,282 | 9/1987 | Winter et al. . |
| 4,704,725 | 11/1987 | Harvey et al. . |
| 4,706,275 | 11/1987 | Kamil . |
| 4,715,061 | 12/1987 | Norwich . |
| 4,716,583 | 12/1987 | Groner et al. . |
| 4,719,647 | 1/1988 | Theis et al. . |
| 4,722,526 | 2/1988 | Tovar et al. . |
| 4,745,468 | 5/1988 | Von Kohorn . |
| 4,748,668 | 5/1988 | Shamir et al. . |
| 4,756,020 | 7/1988 | Fodale . |
| 4,757,267 | 7/1988 | Riskin ........................................ 379/97 |
| 4,761,684 | 8/1988 | Clark et al. . |
| 4,763,191 | 8/1988 | Gordon et al. . |
| 4,764,666 | 8/1988 | Bergeron . |
| 4,766,604 | 8/1988 | Axberg . |
| 4,774,655 | 9/1988 | Kollin et al. . |
| 4,781,377 | 11/1988 | McVean et al. . |
| 4,782,510 | 11/1988 | Szlam . |
| 4,783,796 | 11/1988 | Ladd . |
| 4,783,800 | 11/1988 | Levine . |
| 4,785,408 | 11/1988 | Britton et al. .................... 379/88 X |
| 4,788,682 | 11/1988 | Vij et al. . |
| 4,788,715 | 11/1988 | Lee . |
| 4,788,716 | 11/1988 | Zebe . |
| 4,788,718 | 11/1988 | McNabb et al. . |
| 4,789,928 | 12/1988 | Fujisaki . |
| 4,791,664 | 12/1988 | Lutz et al. . |
| 4,792,968 | 12/1988 | Katz . |
| 4,796,293 | 1/1989 | Blinken et al. . |
| 4,797,910 | 1/1989 | Daudelin . |
| 4,797,911 | 1/1989 | Szlam et al. ............................. 379/92 |
| 4,797,913 | 1/1989 | Kaplan et al. . |
| 4,799,156 | 1/1989 | Shavit et al. . |
| 4,800,583 | 1/1989 | Theis . |
| 4,805,209 | 2/1989 | Baker, Jr. et al. . |
| 4,812,843 | 3/1989 | Champion, III et al. . |
| 4,815,031 | 3/1989 | Furukawa . |
| 4,815,121 | 3/1989 | Yoshida . |
| 4,815,741 | 3/1989 | Small . |
| 4,827,500 | 5/1989 | Binkerd et al. . |
| 4,842,278 | 6/1989 | Markowicz . |
| 4,845,739 | 7/1989 | Katz ........................................ 379/67 |
| 4,847,890 | 7/1989 | Solomon et al. . |
| 4,852,154 | 7/1989 | Lewis et al. . |
| 4,853,882 | 8/1989 | Marshall . |
| 4,856,050 | 8/1989 | Theis et al. . |
| 4,866,756 | 9/1989 | Crane et al. . |
| 4,876,592 | 10/1989 | Von Kohorn . |
| 4,876,717 | 10/1989 | Barron et al. . |
| 4,882,473 | 11/1989 | Bergeron et al. . |
| 4,893,328 | 1/1990 | Peacock . |
| 4,893,330 | 1/1990 | Franco . |
| 4,894,857 | 1/1990 | Szlam et al. . |
| 4,896,345 | 1/1990 | Thorne . |
| 4,897,867 | 1/1990 | Foster et al. . |
| 4,899,375 | 2/1990 | Bauer et al. . |
| 4,907,079 | 3/1990 | Turner et al. . |
| 4,908,761 | 3/1990 | Tai . |
| 4,908,850 | 3/1990 | Masson et al. . |
| 4,922,520 | 5/1990 | Bernard et al. . |
| 4,922,522 | 5/1990 | Scanlon . |
| 4,926,462 | 5/1990 | Ladd et al. ............................. 379/89 |
| 4,937,853 | 6/1990 | Brule et al. . |
| 4,942,598 | 7/1990 | Davis ....................................... 379/142 |
| 4,942,599 | 7/1990 | Gordon et al. . |
| 4,942,616 | 7/1990 | Linstroth et al. . |
| 4,943,995 | 7/1990 | Dandelin et al. . |
| 4,955,047 | 9/1990 | Morganstein et al. . |
| 4,959,783 | 9/1990 | Scott et al. . |
| 4,961,217 | 10/1990 | Akiyama . |
| 4,964,157 | 10/1990 | Aoshima . |
| 4,965,825 | 10/1990 | Harvey et al. . |
| 4,969,183 | 11/1990 | Reese . |
| 4,969,185 | 11/1990 | Dorst et al. . |
| 4,972,461 | 11/1990 | Brown et al. . |
| 4,974,252 | 11/1990 | Osborne . |
| 4,975,945 | 12/1990 | Carbullido . |
| 4,989,233 | 1/1991 | Schakowsky et al. . |
| 4,992,940 | 2/1991 | Dworkin . |
| 4,996,705 | 2/1991 | Entenmann et al. ...................... 379/91 |
| 5,001,710 | 3/1991 | Gawrys et al. . |
| 5,003,574 | 3/1991 | Denq et al. . |
| 5,014,298 | 5/1991 | Katz . |
| 5,017,917 | 5/1991 | Fisher et al. . |
| 5,018,736 | 5/1991 | Pearson et al. . |
| 5,023,904 | 6/1991 | Kaplan et al. . |
| 5,046,183 | 9/1991 | Dorst et al. . |
| 5,083,272 | 1/1992 | Walker et al. . |
| 5,097,528 | 3/1992 | Gursahaney et al. . |
| 5,109,414 | 4/1992 | Harvey et al. . |
| 5,127,003 | 6/1992 | Doll, Jr. et al. . |
| 5,146,491 | 9/1992 | Silver et al. . |
| 5,181,238 | 1/1993 | Medamana et al. . |
| 5,233,654 | 8/1993 | Harvey et al. . |
| 5,255,183 | 10/1993 | Katz . |
| 5,263,723 | 11/1993 | Pearson et al. . |
| 5,333,185 | 7/1994 | Burke et al. . |
| 5,335,277 | 8/1994 | Harvey et al. . |
| 5,351,276 | 9/1994 | Doll, Jr. et al. . |
| 5,353,335 | 10/1994 | D'Urso et al. . |

FOREIGN PATENT DOCUMENTS

| | | |
|---|---|---|
| 1056500 | 6/1979 | Canada . |
| 1059621 | 7/1979 | Canada . |
| 1162336 | 2/1984 | Canada . |
| 1225759 | 8/1987 | Canada . |
| 2009937-2 | 8/1990 | Canada . |
| 0 120 322 | 2/1984 | European Pat. Off. . |
| 0 229 170 | 7/1987 | European Pat. Off. . |
| 0249575 | 12/1987 | European Pat. Off. . |
| 0295837 | 12/1988 | European Pat. Off. . |
| 0342295 | 11/1989 | European Pat. Off. . |
| 0434181 | 6/1991 | European Pat. Off. . |
| 0 568 114 | 11/1993 | European Pat. Off. . |
| 0 620 669 | 10/1994 | European Pat. Off. . |
| 9002131 | 8/1990 | France . |
| OS 2929416 | 2/1981 | Germany . |
| OS 3726366 | 2/1988 | Germany . |
| 4005365 A1 | 8/1990 | Germany . |
| 52-17740 | 9/1977 | Japan . |
| 56-152365 | 11/1981 | Japan . |
| 62-239757 | 10/1987 | Japan . |
| 500138/88 | 1/1988 | Japan . |
| 298158/90 | 12/1990 | Japan . |
| 41855/91 | 2/1991 | Japan . |
| 2184327 | 6/1987 | United Kingdom . |
| 2 230 403 | 10/1990 | United Kingdom . |
| WO 87/00375 | 1/1987 | WIPO . |
| WO88/02966 | 4/1988 | WIPO . |
| WO88/05985 | 8/1988 | WIPO . |
| WO89/02139 | 3/1989 | WIPO . |
| WO89/09530 | 10/1989 | WIPO . |
| WO93/05483 | 3/1993 | WIPO . |

OTHER PUBLICATIONS

Winckelmann, W.A., "Automatic Intercept Service", *Bell Laboratories Record*, May 1968, vol. 46, No. 5, pp. 138–143—(Article).

"Proposed Agreement Between National Enterprises Board (N.E.B.) and Delphi", Jan. 30. 1979.

Voysey, Hedley, "Nexos wins rights to comms engine", *Computing*, Sep. 6, ??, vol. 7, No. 36—(Article).

"Appraisal Of The Fair Market Value Of Delphi Communications", Apr. 30, 1980—(Study) Delphi Communications—(Charts and Exhibits).

"Voice–Response System Improves Order Entry, Inventory Control" *Communication News*, Aug. 1976—(Article).

"Periphonics Voicepack"—(Brochure) (Undated).

"The Voice Response Peripheral That Turnes Every Touch–Tone Telephone Into A Computer Terminal", Periphonics Corporation—(Brochure) (Undated).

Rabin, Jeff, "Minorities Seek 30% Share of All Lottery Operations", *Sacramento Bee*, Apr. 12, 1985—(Article).

Advertisements (Dial Giants Baseball Trivia Game): *San Francisco Chronicle*, Jul. 3, 1984.

Curtis, Cathy, "976 numbers let you dial–a–whatever", *San Francisco Business Journal*, Nov. 26, 1984—(Article).

Ferrell, Jane, "Three little numbers for instant information", *San Francisco Chronicle*, Aug.15, 1984—(Article).

"Dallas Telephone Call–In Game Uses Computer Voice Interface", Sep. 24, 1984—(Press Release).

Rivest, R.L., et al., "A Method for Obtaining Digital Signatures and Public–Key Cryptosystems", *Communications of the ACM*, Feb. 1978, vol. 21, No. 2, pp. 120–126—(Article).

Finnigan, Paul F, "Audiotex: The telephone as data–access equipment", *Data Communications*, 1987, pp. 155–161 (Article).

Ozawa, Y., et al., "Voice Response System and Its Applications", *Hitachi Review*, Dec. 1979, vol. 28, No. 6, pp. 301–305—(Article).

"At&T 2: Reaches agreement with Rockwell (ROK)", Aug. 26, 1986—(Press Release).

"AT&T: Expands Computer speech system product line", Apr. 14, 1986—(Press Release).

Adams, Cynthia, "Conversing With Computers", *Computerworld on Communications*, May 18, 1983, vol. 17, No. 20A, pp. 36–44—(Article).

Hester, S.D., et al., "The AT&T Multi–Mode Voice Systems—Full Spectrum Solutions For Speech Processing Applications", Sep. 1985, pp. 1–10—(Proceedings Of The 1985 AVIOS Conference).

Davidson, Leon, "A Pushbutton Telephone For Alphanumeric Input", *Datamation*, Apr. 1966, pp. 27–30—(Article).

Advertisement: Cuervo Gold Beach Chair, VoiceMail Int'l, '83.

"Digital's All–In–1 Voice Messaging", *Digital*—(Brochure) (Undated).

"Access Voice and Mail Messages From One Familiar Source", *Insight*,—(Article) (Undated).

"Get The Message . . . !" New VoiceMail Features, *Voicemail International, Inc.*, Oct. 1984—(Article).

Brochures (TWA Crew Scheduling/PSA's Reservation System/Universal Studios Program/Dow Phone): "AVIAR The communication system that keeps you flying", VoiceMail Int'l,—(Brochure) ( Undated).

"TWA Voicemail, Flight Attendants Users Guide" Aug. 1986,—(Brochure).

Holtzman, Henry, "Voice Mail Soars At TWA", *Modern Office Technology* (Reprint), Mar. 1986,—(Article).

"Bid Results via Voicemail—Flight Deck Crew Members", May 1, 1985 (Script).

Borden, W.S., "Flight Attendant Self Input Of Monthly Bids Via Touch Tone Telephone", *In–Flight Services Bulletin*, Sep. 15, 1985—(Memo).

"Look Ma, no operators! Automatic voice system doesmany airline jobs", *Air Transport World*, Oct. 1986—(Article).

"1,000,000 Shares Common Stock" *Voicemail International, Inc.,*, Jan. 10, 1984—(Public Offering Summary).

Levinson, S.E., et al., "A Conversational–Mode Airline Information and Reservation System Using Speech Input and Output", *The Bell System Technical Journal*, Jan. 1980, vol. 59, No. 1, pp. 119–137.

Emerson, S.T., "Voice Response Systems—Technology to the Rescue for Business Users", *Speech Technology*, Jan./Feb. '83, pp. 99–103—(Article).

Moslow, Jim, "Emergency reporting system for small communities", *Telephony*, Feb. 11, 1985, pp. 30–32, 34—(Article).

Rabiner, L.R., et al., "Digital Techniques for Computer Voice Response: Implementation and Applications", *Proceedings Of The IEEE*, Apr. 1976, vol. 64, No. 4, pp. 416–432—(Article).

Moosemiller, J.P., "AT&T's Conversant™ I Voice System-"*Speech Technology*, Mar./Apr. 1986, pp. 88–93—(Article).

Frank, R.J., et al., "No. 4 ESS: Mass Announcement Capability", *The Bell System Technical Journal*, Jul./Aug. 1981, vol. 60, No. 6, Part 2, pp. 1049–1081—(Chapter from a Book).

"Chapter I General Description" D.I.A.L. PRM/Release 3—Version 2 Mar. 1987 (Product Reference Manual).

"Announcing Release 3.3" *D–A–S–H– D.I.A.L. Application and Support Hints*, Jan./Feb. Mar. 1987, vol. 3, No. 1—(Brochure).

"D.I.A.L. Software Relase 4", *OPCOM*, Jan. 1988, Version 1—(Product Reference Manual).

Brady, R.L., et al., "Telephone Identifier Interface", *IBM Technical Disclosure Bulletin*, Oct. 1976, vol. 19, No. 5, pp. 1569–1571—(Article).

Corbett, A.J., "Telephone Enquiry System Using Synthetic Speech", *University of Essex*, Dec. 1974, (Thesis).

Yoshizawa, K., et al., "Voice Response System for Telephone Betting", *Hitachi Review*, Jun. 1977, vol. 26, No. 6 —(Article).

Sagawa, S., et al., "Automatic Seat Reservation By Touch–Tone Telephone", *Second USA Japan Computer Conference*, 1975, vol. 2, pp. 290–294—(Article).

Smith, S.L., "Computer–Generated Speech and Man–Computer Interaction", *Human Factors*, 1970, 12(2), pp. 215–223—(Article).

Newhouse, A., et al., "On The Use Of Very Low Cost Terminals", *University of Houston*, pp. 240–249—(Paper) (Undated).

Mullen, R.W., "Telephone—home's 'friendliest' Computer", *Inside Telephone Engineer And Management*, May 15, 1985, vol. 89, No. 10, —(Article).

"Telephone Computing Entering Service Bureau Business", *American Banker*, Jul. 5, 1979—(Article).

Kutler, Jeffrey, "Technology, System Sharing Improve Phone Banking Outlook", *American Banker*, Dec. 7, 1979, vol. CXLIV, No. 237—(Article).

Kutler, Jeffrey, "Phone Bill Paying Accessed by Pioneer", *American Banker*, Dec. 7, 1979, vol. CXLIV, No. 237—(Article).

"User's Guide", *Dowphone* (Undatetd).

"Audiotex Information From Dow Jones", *The Computer Review*, Nov. 1984, vol. 2, No. 1—(Article).

"Dow Phone Adds Innovest Systems' Technical Analysis Reports" *IDP Report*, Jan. 3, 1986—(Report).

Perdue, R.J., et al., "Conversant 1 Voice System: Architecture and Applications", *AT& T Technical Journal*, Sep./Oct. 1986—(Article).

Martin, James, "Design of Man–Computer Dialogues", *IBM System Research Institute*, Chapter 16, pp. 283–306—(Chapter from a Book) (Undated).

Kaiserman, D.B., "The Role Of Audio Response In Data Collection Systems", *Proceedings of the Technical Sessions*, Paleis des Expositions, Geneva, Switzerland, Jun. 17–19, 1980, pp. 247–251—(Article).

Boies, S.J., et al., "User Interface for Autio Communication System", *IBM Technical Disclosure Bulletin*, Dec. 1982, vol. 25, No. 7A, pp. 3371–3377—(Article).

Kramer, J.J., "Human Factors Problems in the Use of Pushbutton Telephones for Data Entry", *Bell Telephone Laboratories*, Holmdel, N.J., Apr. 74, pp. 241–258—(Paper).

Cox, Jr., Floyd, "Flora Fax", Jan. 22, 1986—(Letter and Advertisements).

Isayame, Tetsuya, "Automatic Response Processing Equipment as a Multi–media Communication Node", *Japan Telecommunications Review*, 1987, vol. 29, No. 1, pp. 29–36—(Article).

Imai, Y., et al., "Shared Audio Information System Using New Audio Response Unit" *Japan Telecommunications Review*, Oct. 1981, vol. 23, No. 4, pp. 383–390—(Article).

"Distrust of computer kills home service plan" (date and source missing).

"Automatic Call Distributor/Management Information System: Interface between 1/1AESS™ Switch Central Office and Customer Premises Equipment", *Bell Communications Research*, Dec. 1986, Technical Reference TR–TSY–000306, Issue 1—(Article).

"Comparison Of ACD Systems", *Connection*, Feb. 1990—(Chart).

"ACD Comparison", *Aspect*, Feb. 2, 1990—(Final Report).

Lanzeter, Ygal, "Automatic Number Identification System For Step–By–Step Exchanges", *The Ninth Convention of Electrical and Electronics Engineers In Israel*, Apr. 1975—(Paper).

Flanagan, J.L., et al., "Speech Synthesis", Chapters 1, 39, 42, 45 and 46—(Chapter from a Book).

"Bell Atlantic's Bolger Wants To Be Free", *Telephony*, Jul. 14, 1986—(Article).

"Advanced New Cable TV Technology Developed For Impulse–Pay–Per–View", Jun. 3, 1985—(Search).

Noll, M.A., "Introduction to Telephones & Telephone Systems", Second Edition, Chapter 9—(Chapter from a Book).

"Proposal for Kome Mediavoice Interactive Phone/Database Marketing System", Mediavoice Startup Software Package For Kome Optional Mediavoice Software Packages For Kome Why ATI Mediavoice Is The Choice For Success— (Proposal).

Meade, Jim, Dec., 29, 1992—(Letter).

"All About Voice Response", *Datapro Research Corporation*, Delran, N.J., Mar. 1972 and Sep. 1974—(Article).

"Voice Response in Banking Applications", *Datapro Research Corporation*, Delran, N.J., Oct. 1974 and Feb. 1983 —(Article).

Schiller, T.R., "Field Craft Technician Communication With A Host Computer Synthesized Voice", *Proceedings AVIOS '86 Voice I/O Systems Applications Conference*, Sep. 16–18, 1986.

Rabin, Richard, "Telephone Access Applications: The Growth Market For Voice Processing ", *Proceedings AVIOS '86 Voice I/O Systems Applications Conference*, Oct. 6–8, 1987.

Schuster, E.R., "B.R.U.T.U.S. Better Registration Using Touch–Tone phones for University Students", *Proceedings AVIOS '86 Voice I/O Systems Applications Conference*, Oct. 4–6, 1988.

"Exxon's Next Prey. IBM and Xerox", *BusinessWeek*, Apr. 28, 1980, pp. 92–96 and 103—(Article).

Weinstein, S.B., "Emerging Telecommunications Needs of the Card Industry", *IEEE Communications Magazine*, Jul. 1984, vol. 22, No. 7, pp. 26–31—(Article).

"Riding Gain", *Broadcasting*, Mar. 7, 1983—(Article).

Pickup, Mike, "Bank from home, by screen or by phone", *Building Society Gazette*, Jul. 1988—(Article).

Pickup, Mike, "Voice Response", *Computer Systems*, Sep. 1986—(Article).

Rabiner, L.R., et al., "Isolated and Connected Word Recognition—Theory and Selected Applications", *IEEE Transaction Communications*, May 1981, Com. 29, No. 5, pp. 621, 622, 633, 644–646, 655–659—(Article).

Takahashi, K., et al., "The Audio Response System for Telephone Reservation", *U.D.C.*.

Oka, Y., et al., "Development of Ventilating Equipment for Shinkansan Train", *U.D.C.* —(Articles in Japanese).

Pagones, M.J., et al., "New services follow increased digitization on the long–haul transmission network", *AT&T Bell Laboratories Record*, 1983, vol. 61, pp. 25–33—(Article).
"New phone service tells customer who's calling", *Bell Laboratories Record*, 1984, vol. 62, p. 9—(Article).
Hirschman, C.B., et al., "LASS: Putting the telephone customer in charge", *Bell Laboratories Record*, 1985, vol. 63, pp. 10–16—(Article).
"AT&T building communications network for Defense Department" and "AT&T inaugurates pay–per–view TV", *Bell Laboratories Record*, 1986, vol. 64, p. 2—(Article).
"Power To . . . ", *Dialogic Corporation*, Littleton Road,— (unidentifiable Article).
"Representaive Customer List For Interface Technology's Total Entry System", Toes Solutions—Pharmaceutical Manufacturer, The Voice Response Solution For Answering Customer/Sales Calls, Toes Solutions—Orthopedic Equipment and Toes Solutions –Convenience Store—(Articles).
Lummis, R.C., "Speaker Verification: A Step Toward the "Checkless" Society," *Bell Laboratories Record*, pp. 254–229—(Article).
Flanagan, J.L., et al., "Synthetic voices for computers", *IEEE Spectrum*, Oct. 1970, vol. 7, No. 10, pp. 22–45—(Article).
Rabiner, L.R., et al., "Computer Synthesis of Speech by Concatenation of Formant–Coded Words", *The Bell System Technical Journal*, May/Jun. 1971, pp. 1541–1558—(Chapter from a Book).
Flanagan, J.L., et al., "Wiring Telephone Apparatus from Computer–Generated Speech", *The Bell System Technical Journal*, Feb. 1972, pp. 391–397—(Chapter from a Book).
Hornsby, Jr., Thomas G., "Voice Response Systems", *Modern Data*, Nov. 1972, pp. 46–50—(Article).
Diffie, W., et al., "New Directions in Cryptography", *IEEE Transactions On Information Theory*, Nov. 1976, vol. IT–22, No. 6, pp. 644–654—(Article).
Rosenthal, L.H., et al., "Automatic voice response: interfacing man with machine", *IEEE Spectrum*, Jul. 1974, vol. 11, No. 7—(Article).
Rosenthal, L.H., et al., "A Multiline Computer Voice Response System Utilizing ADPCM Coded Speech", *IEEE Transactions on Acoustics, Speech, and Signal Processing*, Oct. 1974, vol. ASSP-22, No. 5, pp. 339–352—(Article).
Flanagan, James L., "Computers that Talk and Listen: Man–Machine Communication by Voice", *Proceedings for the IEEE*, Apr. 1976, vol. 64, No. 4, pp. 405–415—(Article).
Maisel, Ivan, "To Put Your Baseball Savvy On the Line, Pick Up The Phone And Call", *Sports Illustrated*, Sep. 3, 1984— (Script).
Brown, Merrill, "Hollywood Saga: Who Bought J.R.?", *The Washington Post*, Final Edition, Oct. 14, 1984—(Script).
"Special–Olympics; Teams with baseball trivia expert Brad Curtis", *Business Wire*, Sep. 30, 1985—(Script).
Lucas, W.A., et al., "The Spartanburg Interactive Cable Experiments In Home Education", *Rand Corp.*, U.S. Department of Commerce, National Technical Information Service, Feb., 1979—(Publication).
Martin, James, "Viewdata And The Information Society",— (Book).
Gawrys, G.W., "Ushering In The Era Of ISDN", *AT&T Technology*, 1986, vol. 1, No. 1, pp. 2–9—(Article).
Cummings, J.L., et al., "AT&T Network Architecture Evolution", *AT&T Technical Jouranl*, May/Jun. 1987, vol. 66, Issue 3, pp. 2–12—(Article).

Yates, C.E., "Telemarketing And Technology: Perfect Business Partners", *AT&T Technology*, 1987, vol. 1, No. 3, pp. 48–55—(Article).
Herr, T.J., "ISDN Applications In Public Switched Networks", *AT&T Technology*, 1987, vol. 2, No. 3, pp. 56–65— (Article).
"Only the best. Only from Florafax", *Florafax*—(Advertisement).
Aldefeld, B., et al., "Automated Directory Listing Retrieval System Based on Isolated Word Recognition", *Proceedings of the IEEE*, Nov. 1980, vol. 68, No. 11, pp. 1364–1379— (Article).
Rabiner, L.R., et al., "On the Application of Embedded Training to Connected Letter Recognition for Directory Listing Retrieval", *AT&T Bell Laboratories Technical Journal*, Mar. 1984, vol. 63, No. 3, pp. 459–477—(Chapter from a Book).
Rosenberg, A.E., et al., "Recognition of Spoken Spelled Names for Directory Assistance Using Speaker–Independent Templates", *The Bell System Technical Journal*, Apr. 1980, vol. 59, No. 4, pp. 571–592—(Chapter from a Book).
"The Voicestar Series By Periphonics", *Periphonics*, Jan. 1986—(Publication).
"Bank–From–Home system by Periphonics Corporation".
"Bill Payment Success Story", *Periphonics Corporation*.
"A History of Imagination", *Periphonics*.
"Banking Success Story", *Periphonics Corporation*.
"DataVoice and the PDT II", *Periphonics Corporation*.
"Banking Success Story", *Periphonics Corporation*—(Brochures).
Schulman, Roger, "TeleLearning: The Computer Brings the Classroom Home", *Family Computing*, Sep. 1984, pp. 50–53—(Article).
"ICS launches new ?–home interactive video service package", *Cable Vision*, Sep. 3, 1984, pp. 71/73—(Article).
"The Remarketing of Prestel", *Which Computer?*, Aug. 1984, pp. 106, 107 and ?—(Article).
"Four–Line TeleClerk Calls, Answers, Stores, Surveys", *Hardcopy*, Jan. 1985, vol. 14, No. 1—(Article).
"Peripheral Speaks On Phone", *Hardcopy*, Dec. 1984— (Article).
Page from *What's new in Computing*, Apr. 1985—(Article).
Page from *Today*, A Compuserve Publication, Jun. 1985— (Article).
Page from *Computer Communications*, Feb. 1984, vol. 7, No. 1—(Article).
Gits, Victoria, "Interactive device doesn't interrupt telephone cells", *Cable Vision*, Jun. 17, 1985, p. 20—(Article).
Cuilwik, Tony, "Reach Out & Touch The Unix System", *Unix Review*, Jun. 1985, pp. 50, 52, 53, 56—(Article).
Blackwell, Gerry, "Dia–a–Quote: first Canadian commercial audiotex service", *Computing Canada*—(Article).
Applebaum, Simon, "Two–way television" *Cable Vision*, Aug. 8, 1983, p. 66—(Article).
Sw??ne, Michael, "Fiber–optic TV network lets viewers talk back," *Info World*—(Article).
Morrill, C.S., et al., "User Input Mode and Computer–Aided Instruction", *Human Factors*, 1968, 10(3), pp. 225–232— (Chapter from a Book).
Results of Lexis Search Request for "Dial Info or Dialinfo", Date of Search Apr. 13, 1992, pp. 1–38.
Results of Lexis Search Request for "Phone Programs or International Information Network", Date of Search Apr. 15, 1992, pp. 1–35.

Van Gieson, Jr. W.D., et al., "Machine–Generated Speech for use With Computers, and the problem of fitting a spoken word into one half second", *Computers and Automation*, Nov. 1968, pp. 31–34—(Article).
Patel, Jay, "Utility of voice response system depends on its flexibility", *Bank Systems & Equipment*, Dec. 1988, pp. 101/103—(Article).
Buron, R.H., "Generation of a 1000–Word Vocabulary for a Pulse–Excited Vocoder Operating as an Audio Response Unit", *IEEE Transactions On Audio And Electroacoustics*, Mar. 1986, vol. AU–16, No. 1, pp. 21–25—(Article).
Gaines, B.R., et al., "Some Experience in Interactive System Development and Application", *Proceedings of the IEEE*, Jun. 1975, vol. 63, No. 6, pp. 894–911—(Article.
"Application For Registration Of Equipment To Be Connected To The Telephone Network", *Federal Communication Commission*, FCC Form 730.
Dudley, Homer, "The Vocoder", Circuit Research Department, Dec. 1939, pp. 122–128—(Chapter from a Book).
"Voice Response System Order Entry, Inventory Control".
"Vendor Index", *Audiotex Directory & Buyer's Guide*, Fall/Winter 1989/90, pp. 114–156.
Francas, M., et al., "Input Devices For Public Videotex Services", *Human–Computer Interaction—Interact '84*, 1985, pp. 171–175—(Paper).
Labrador, C., et al., "Experiments In Speech Interaction With Conventional Data Services", *Human–Computer Interaction—Interact '84*, 1985, pp. 225–229—(Paper).
Long, J., et al., "Transaction Processing Using Videotex or: Shopping on Prestel", *Human–Computer Interaction—Interact '84*, 1985, pp. 251–255—(Paper).
*Electrical Communication*, 1981, vol. 56, Nos. 1–4, pp. 1–110—(Paper).
Conway, R.W., et al., "Tele–CUPL: A Telephone Time Sharing System", *Communication of the ACM*, Sept. 1967, vol. 10, No. 9, pp. 538–542—(Article).
Marill, T., et al., "Data–Dial: Two–Way Communication with Computers From Ordinary Dial Telephones", *Communications of the ACM*, Oct. 1963, vol. 6, No. 10, pp. 622–624—(Article).
Witten, I.H., "Communicating With Microcomputers", pp. 121–158—(Chapter from a Book).
"Cell–It–Co. Hangs Up On Dial–It In Four Markets", *The 976 Exchange*, 1984, vol. 2, pp. 1–6 (Article).
"DECtalk Help Boston's Shawmut Bank Cut Costs And Improve Service", *Digital*—(Article).
"VTK 81 Voice Computer", *Voicetek*, 1987 (Brochure).
"How A Computerized Voice Answers Customer's Inquiries", *Bank Automation Newsletter*, Feb. 1985, vol. 19, No. 2 (Article).
Rickman, J., et al., "Speech Synthesizers—Communications Interface—Implementing A Touch Tone Telephone Talker With DECtalk", *The DEC Professional*, May 1985, pp. 38, 39, 42–44 (Article).
"Dectalk Delivers", *Digital Review*, Sep. 1985—(Article).
DECtalk turns a telephone into a terminal,—UNIX and Digital,—Legal protection for semiconductor chips,—Product safety,—*Decworld*, Apr. 1985, vol. 9, No. 2, pp. 1,3,5, 6–8—(ArRicle).
"DECtalk: A New Text–to–Speech Product" *Digital Guideline*, Mar. 1984, vol. 8, No. 3, pp. 1–8—(Article).
*Straight Talk*, A Newsletter about the DECtalk Speech Synthesizer from Digital Equipment Corporation, vol. 1, No. 1, pp. 1–6.
*Straight Talk*, A Newsletter about the DECtalk Speech Synthesizer from Digital Equipment Corporation, vol. 1, No. 2, pp. 1–7.
*Straight Talk*, A Newsletter about the DECtalk Speech Synthesizer from Digital Equipment Corporation, vol. 1, No., 3, pp. 1–8.
*Straight Talk*, A Newsletter about the DECtalk Speech Synthesizer from Digital Equipment Corporation, vol. 1, No. 4, pp. 1–8.
*Straight Talk*, A Newsletter about the DECtalk Speech Synthesizer from Digital Equipment Corporation, vol. 2, No. 2, pp. 1–8.
*Straight Talk*, A Newsletter about the DECtalk Speech Synthnesizer from Digital Equipment Corporation, vol. 2, No. 4, pp. 1–8.
Various References/Articles attached with a letter from Smithwin Associates, dated Apr. 22, 1992.
Riley, A.A., "Latest: 2–way communication by computer and telephone".
??evens, W.?., "Computer Helps Children to Add", *The New York Times*, Apr. 20, 1970.
Harvey, R.W., *Times*, The Kiplinger Magazine.
"A Computerized System ???", Nov. 23, 1970, p. 14, (unidentifiable Article).
"Hardware for the 'cashless society'", *Electronic Design 3*, Feb. 4, 1971, p. 26.
Tennant, R.P., "Advanced credit system smooths operation and hastens payout", *Data Procesing Magazine*, Jun. 1971, vol. 13, No. 6, pp. 34–35.
"Computers that talk back to you", *Business Week*, Date ??.
Smith, Gene, "Chatting Via Computer", *New York Times*, Sep. 12, 1971.
*EDP Weekly*, (unidentifiable Article).
"Did Anybody Here Call a Computer", *Data Management*, Feb. 196?.
Skala, Martin, "Straight talk from a computer", *Christian Science Monitor*, Jun. 14, 1973.
"Computer for Watergate Probe", *Science*, Jun. 15, 1973.
"Tapping AT&T for a $50–million refund", *Business Week*, Jun. 9, 1973.
"Distrust of computer kills home service plan".
Scherer, Ron, "Chitchat with a computer", *Christian Science Monitor*, Apr. 16, 1975, p. 2.
"Trying Out the Pay–by–Phone Service", *Technology Review*, Mar./Apr. 1976, p. 15.
"Pentagon seeks more control", *Electronics*, Apr. 5, 1976, p. 39.
"Everyman's Computer Terminal", *Industrial Research*, Mar./Apr. 1976, p. 14.
"DOD could save on test equipment".
"Talking computer speeds Ford parts", April 25, 1976.
"Customers of Ten Banks Paying Bills by Phone", *Computer World*, 1976, p. 12.
"FAA to test computerized voice response to queries from pilots", *Electronics*, Nov. 25, 1976, p. 43.
Miller, F.W., "Voice Response Comes to Life with Order Entry", *Infosystems*, Oct. 1981, pp. 62/64.
Suppes, Patrick "University–Level Computer–Assisted Instruction At Stanford: 1968–1980", *Institute for Mathematical Studies In The Social Sciences, Stanford University*, 1981, pp. 589–716.
Lerner, E.J., "Products that talk", *IEEE spectrum*, Jul. 1982, pp. 32–37.
Carlsen, Clifford "Megaphone plans to blare message on national scale", *Times*, Mar. 2, 1987.

Michelson, Marlene "All kinds of information at your fingertips by phone", *Business Times*, Sep. 8, 1986, vol. 3, No. 19.
Lacter, Mark, "At Megaphone, It's Always Show Time", *San Francisco Chronicle*, Jun. 9, 1986.
Table of Contents, *Megaphone Press Book*, pp. 1–3.
"Miss Simpson, will you dial–a–joke for me please?", Cartoon.
Lacter, Mark, "At Megaphone, It's Always Show Time", *San Francisco Chronicle*, Jun. 9, 1986, Year No. 123, (different perspective).
Lacter, Mark, "Narrating Fantasy Mesages—It's No Dream Job", *San Francisco Chronicle*, Jun. 9, 1986.
"Megaphone Serves High–Tech Showbiz", *San Francisco Chronicle*, Jun. 9, 1986.
"Megaphone Reaches Unique Market", *San Francisco Chronicle*, Jun. 9, 1986.
Feuer, Jack, "Asher/Gould: Megaphone Dials–a–Shop", *Adweek*, May 12, 1986.
Symnovich, Steve "Novelty over the phone porn vendors", and continuation Big firms breathing down necks of small phone porn outfits, *San Francisco Business Journal*, May 5, 1986.
Wilke, Johm, "A 'Dream'Business That's Just A Phone Call Away", *Information Processing*,
Ketcham, D.E., "Dial–a–You–Name–It", *San Francisco Chronicle*, 1986.
Carter, Alan, "What? You didn't know Erica was engaged again?", *Daily News*, Mar. 12, 1986.
"Firm plugs into sales with time, temp lines", *Crain's New York Business*, Mar. 3, 1986, vol. II, No. 9.
Pitts, Gail, "Phone–in trivia games ring up profits", *The Denver Post*, Feb. 3, 1986.
"Merge Towards Success", IIN and Megaphone, *The 976 Exchange*, Winter 19?6, vol. 4.
Nelson, David, "From dating to soap operas, 976 numbers come on line", *San Jose Business Journal Magazine*, Jan. 27, 1986.
Greengard, Samuel, "Dial–A–Deluge", *Business*, Nov. 1985.
"Numbers, Please", *Busines*, Nov. 1985.
"The 976 Telelease Co.", *Business Opportunities Journal*, Dec. 1985.
"One–time refund for '976' charges ", *San Francisco Examiner*, Nov. 7, 1985.
Kent, Debra, "Interactive phone network stretches for calls", *Advertising Age*, Oct. 17, 198?.
"Making Your Phone Talk To Computers", *U.S. News*, Sep. 23, 1985.
Mulqueen, John, "Int'l Information Network Eyes Contact With British Telecom", *Communications Week*, Sep. ??.
Moorehead, Derrol, "Humor, romance: just a call away", *Rocky Mountain Collegian*, Sep. 19, 1985, vol. 94, Iss. 32.
Keppel, Bruce, "Move Under Way to Curb Abuse of Popular Dial–It Service",*Los Angeles Times*, Sep. 1, 1985.
"Dial–a–stock", *Forbes*, Aug. 1985.
Sowa, Tom, "Games people play now include phone trivia", *Spokesman–Review*, Jul. 1985.
Dougherty, P.H., "Advertising Telephone Is Growing As Medium", *The New York Times*, Jul. 17, 1985.
Larson, Judy, "976 numbers intice adults—and kids", *Fremont Argas*, Jul. 8 1985.
Barbieri, Richard, "Prime Time for the Telephone", *Channels*, May/Jun. 1985, pp. 54–55.

"Bank Provides Financial Fuel To Fast Track Company", *The Financial Center Bank*, First Quarter 1985, vol. II, No. 1.
"Don't Phone Santa", San Francisco Chronicle, Letters to the Editor, Mar. 29, 1985.
Carvalho, Deborah, "Will Hillary find happiness with Bob?", *Contra Costa Times*, Mar. 15, 1985.
Murphy, Win, "Dial–a–romance", Mar. 13–19, 1985.
?, Martha, "Love, laughs, luck: Just a phone call away", *Burlington County Times,* Feb. 17, 1985.
Robinett, Stephen, "Blood From A Rock", *Venture*, Jan. 1985, pp. 38–41, 44–45.
Du Brow, Rick, "Lates hot lines for instant trivia pursuit", *Los Angeles Herald Examiner*, Dec. 6, 1984.
"Keep up with your favorite soap operas", *Contra costa Times*, Nov. 30, 1984.
Hanna, Barbara, "Inside Radio/TV".
Behr, Debra, "'Victory'makes and writes its own on–the–road news", and Whose calling? Michael fans most likely . . . , *Los Angeles Times*, Nov. 29, 1984.
"Newcomer Megaphone Has Magnanimous Goals", *The 976 Exchange*, Fall 1984, vol. 2.
"Phone Santa", *Vecaville Reporter*, Nov. 10, 1984.
"Dial 976 for Profits", *Time*, Sep. 3, 1984.
Pendleton, Mike, "For A Fee Your Phone Can Inform", *Burrelle's,* Jul. 19, 1984.
"Phone numbers to get details about soaps'", *Burrelle's*, Jul. 18, 1984.
Gansberg, A.L., "976 phone prefix as new entertainment fad", *The Hollywood Reporter*, Jun. 21, 1984.
Carvalho, Deborah, "Another 'GH' actor discontented with the soap", *Contra Costa Times*, May 26, 1984, p. 4.
"Keep up with your favorite soap operas", *San Francisco Examiner.*
Du Brow, Rick, "'Dial–a–soap' service offers daily TV summaries", *Los Angeles Herald Examiner*, Apr. 26, 1984.
News briefs, Feb. 1966.
Martin, J., et al., "The Computerized Society—An apprisal of the impact of computers on society over the next fifteen years", Chapter 10, pp. 211–226—(Chapter from a Book).
New products, *Datamation*, Jul. 1966, vol. 12, No. 7, pp. 7/89—(Article).
Meacham, l.A., et al., "Tone Ringing and Pushbutton Calling", *The Bell System Technical Journal*, 1958, pp. 339–360—(Book).
Suppes, Patrick, "The Uses of Computers in Education", *Scientific American*, Sept. 1966. vol. 215, No. 3, pp.—(Article).
Bruckert, E., et al., "Three–tiered software and VLSI aid developmental system to read text aloud", *Electronics*, Apr. 21, 1983, pp. 133–138—(Article).
Hochman, David, "Implementing Automatic Number Identification", *Telecomunications*, Dec., 1978, vol. 12, No. 12—(Article).
Martin, James, "Telecommunications and the Computer", 2nd Edition, Introduction, pp. 20–23, Chapter 5, pp. 94–95, Chapter 18—(Chapter from a Book).
Martin, James, "Telematic Society", Chapter 6, pp. 45–48, Chapter 9, pp. 67–69, Chapter 20, pp. 181–188—(Chapters from a Book).
Martin, James, "The Wired Society", pp. 53–55, 71–79, 99–100, 204–205, 229–231—(Chapters from a Book).

Martin, James, "Future Developments in Tele–Communications", 2nd Edition, Box A, Chapter 1, p. 5, Chapter 7, pp. 95–111, Chapter 9, pp. 149–105, Chapter 12, pp. 207–209, Chapter 18, pp. 310–311, Chapter 19, pp. 314–317, 320, Chapter 20, pp. 330, Chapter 23, pp. 379–401—(Chapters from a book).
Ferrarini, E.M., "Infomania", pp. 59–61, 176–177, 191, 213–214, 223, 245, 250, 257, 285, 286—(Book).
Kimura, Y., et al., "Audio Response System", vol. 55, No. 10, pp. 49–54—(Article in Japanese).
Takano, H., "Characteristics of Multipair Exchange Area Telephone Cable with Cellular Polethylene Insulation by Gas Injection Blouing", p. 55—(Article In Japanese).
Takahashi, T., et al., "SR–2000 Voice Processor and Its Application", *NEC Research and Development*, 1984, No. 73, pp. 98–105—(Paper).
"Concept Diagram Voicemail International System"Voicemail Instruction Manual, *Televoice International*, Jun. 1981, Index.
Eckhouse, John, "Voice mail spells relief for phone frustration", *San Francisco Examiner*, Feb. 7, 1982—(Article).
Meade, Jim, "Throw away those pink Call–back slips", *InterOffice*, Jan./Feb. 1984, vol. 3, No. 1—(Article).
Welsh, Jack, "Everybody's Talking About Talking Bouquets", *Design for profit*, Spring 1986, pp. 7–10—(Article).
Mosco, Vincent, "Pushbutton Fantasies", Contents, Chapter 3 and 4, pp. 67–118—(Chapters from a Book).
Bretz, Rudy, "Media for Interactive Communication", Chapter 5, pp. 110–116, Chapter 7, pp. 143–153—(Chapters from a Book).
Robinson, G., et al., "Touch–Tone Taletext A Combined Teletext–Viewdata System", *IEEE Transactions on Consumer Electronics*, Jul. 1979, vol. CE–25, No. 3, pp. 298–303—(Article).
Voice News, Mar. 1982.
Voice News, Jun. 1982, *William W. Creitz*.
Voice News, Oct. 1982, p. 5.
Voice News, Nov./Dec. 1983.
"consultant Report 28?", *AIS American Bell Advanced Information Systems*, Apr. 1983, pp. 27, 118–119. 123–124—(Report).
"T–1 Board Sets Deliver High Performance All Digital T–1 Solutions", *NMS Naturla MicroSystems*—(Product Bulletin).
"VBX Product Family Overview", *NMS Natural MicroSystems*, pp. 1–20—(Brochure).
"Machine Operation Manual", May 12, 1978, Issue 1, pp. 1–3, 9–10—(Manual).
Davey, J.P., "Dytel Western Region Sales Training Manual", 1985—(Manual).
Gutcho, Lynette, "DECtalk—A Year Later", *Speech Technology*, Aug./Sep. 1985, pp. 98–102—(Article)
Daniels, Richard "Automating Customer Service", *Insurance Software Review*, Aug./Sep. 1989, pp. 60–62—(Article).
Golbey, S.B., "Fingertip Flight Service", Oct. 1985—(Article).
"ARO Goes Pushbutton", *Newsletter*, Nov. 1985, p. 9—(Article).
"ROLM Centralized Attendant Service", *ROLM Corporation*, 1979.
"AIS, Versatile Efficient Information Service", *Fujitsu Limited*, 1972, pp. 153–162—(Brochure).

Smith, S.L., et al., "Alphabetic Data Entry Via the Touch–Tone Pad: A Comment", *Human Factors*, 1971, 13(2), pp. 189–190—(Book).
Holtzman, Henry, "Still an Infant Technology Voice Mail", *Modern Office Technology*, Jun. 1985, pp. 78–80, 82, 84, 90—(Article).
Leander, Monica, "Voice Response—A Technology for Solving Management Problems", *Speech Technology*, Mar./Apr. 1986, pp. 50–52—(Article).
Stolker, Bud, "CompuCorder speech storage and output device. (evaluation)", *Creative Computing*, Jul. 1983, pp. 1–7.
Witten, I.H., et al., "The Telephone Enquiry Service: a man–machine system using synthetic speech", *Int. J. Man–Machine Studies*, Jul. 1977, 9, pp. 449–464—(Book).
Gould, R.L., "Fidelity's Automated Voice Response System", *Telecommunications*, Jan. 1981, pp. 27–28—(Article)
"Fidelity Automated Service Telephone", *Fidelity Group*, 4 pp.—(Manual).
"Data Set 407 Interface Specification", *Manager—Data Systems & Operations*, Jun. 1975, Issue 2, pp. 1–69 plus Table of Contents—(Manual).
Fitzwilliam, J.W., et al., "Transaction Network, Telephones, and Terminals", *The Bell System Technical Journal*, Dec. 1978, vol. 57, No. 10, pp. 3325–3537—(Book).
*Inbound Outbound*, May 1988, complete issue.
Koch, Helmut, "Concord Design Services,Inc. Corporate Description", *Exacom*.
Federal Communications Commission, FDC Form 484, Registration, Registrant: Concord Design Services, Inc. Exacom Telecomunication Systems—Brochure.
General Description Installation and Operation Manual for Direct Inward Dial (DID) Trunk Interface Unit, *Exacom Telecommunication Systems*, Nov. 21, 1989, Issue 3—(Manual).
General Description Installation and Operation Manual for Answering Service Monitor System, *Concord Design Services, Inc.*, Dec. 19, 1986, Issue 1—Manual.
"Dialogic Voice Solutions", *Dialogic Corporation*, pp. 1–72.
"Why Is T–1 Important And How Can It Be Used", *Dialogic Corporation*, Application Note, pp. 1–6.
"Use of Dialogic T–1 For Telemarketing Applications", *Dialogic Corporation*, Application Note, pp. 1–6.
"Use of Dialogic T–1 In Operator Service Applications", *Dialogic Corporation*, Application Note, pp. 1–6.
"Use of Dialogic T–1 In Telephone Company Networks", *Dialogic Corporation*, Application Note, pp. 1–10.
"Use of Dialogic T–1 Equipment in CPE Gateways", *Dialogic Corporation*, Application Note, pp. 1–4.
"Integrating Analog Devices into Dialogic–Based T–1 Voice Processing Systems", *Dialogic Corporation*, Application Note, pp. 1–16.
"Use of Dialogic Components in Automatic Number Identification (ANI) Systems", *Dialogic Corporation*, Application Note, pp. 1–16.
"Dialogic Unit Pricing", pp. 1–6.
"Voice '92 Spring Conference & Exposition", 1992, pp. 1–24—(Brochure).
"Telecom Developers '92", Jan. 1992—(Advertisement).
Newton, Henry, "The Sheer Thrill Of It All", *Teleconnect*, May 1991.
"AFIPS Conference Proceedings", 1987 National Computer Conference, Jun. 15–18, 1987, Chicago, Illinois.
"Dynamic Network Allocation".

"Calling your computer is as easy as calling your broker, says AT&T," *Record*, Nov. 1985.

Singleton, L.A., "Telecommunications in the Information Age", Chapter 12, pp. 115–125—(Chapter from a Book).

Weitzen, H.S., "Telephone Magic", pp. 28–31, 38–39, 54–55, 62–67, 700–79, 82–85, 88–91. 106–115, 118–121, 126–127, 134–137, 176–177, Index—(Chapters from a Book).

Weitzen, H.S., et al., "Infopreneurs", pp. 18–19, 138–145, 206–209, Index—(Chapters from a Book).

Sullivan, Kathleen, "Paper firm relies on voice–based inventory system", *IDG Communications,Inc.*, Sep. 10, 1984—(Script).

"VTK Training Section"and "Disk Initialization Procedures for VTK–30/60", *Voicetek Corporation*—(Manual).

"VoiceStor Systems Integration Guide", *Voicetek Corporation*, May 2, 1983—(Manual).

"VTK 60 Voice Computer—Technical Description", *Voicetek Corporation*, Oct. 1986—(Manual).

"Voicetek VS–50 Telephone Interface System", Apr. 25, 1984, System Integration Guide—(Manual).

"VTK Voice System—Programmers Guide", *Voicetek*—(Manual).

"Disk Initialization Procedures for VTK–30/60", *Voicetek Corporation*—(Manual).

"VTK81 Voice Computer —Technical Description", *Voicetek Corporation*, Oct. 1986—(Manual).

"VTK Voice System—VTK/CE Guide", *Voicetek*, Jul. 6, 1987—(Manual).

Newton, Harry, "Newton's Telecom dictionary", *Telecom Library Inc.*, 1991—(Advertisement).

"1987 Buyers Guide", *Teleconnect*, Jul. 1987, pp. 194, 197–210—(Brochure).

Syntellect Inc.—Advertisements.

Various copies of Business cards.

Guncheon, M.C., "The Incredible Dial–A–Message Directory", *Contemporary Books, Inc.*, 1985—(Directory).

"Voice Box Maintenance Manual", *Periphonics*, 1986—(Manual).

"Voicepac Maintenance Manual", *Periphonics*, 1984—(Manual).

Dyer, Ellen "Wichita Firm Sells 25% Share", Dec. 14, 1987, and Spectrum Carving Role In Volatile Business, Jul. 7, 1986, Search Results.

"Don't Miss The Unique Gift Idea Of The Year", *Yam Educational Software*, 1987—(Advertisement).

"Welcome to the future of advertising.", *Teleline, Inc.*, 1990—(Presentation).

"Greeting Card Project", *Teleline, Inc.*, Nov. 7, 1988—(Flow Chart).

Sharkey, Betsy, "Dialing for Dollars and Data", *Adweek*, Nov. 16, 1987, pp. 6–8—(Article).

Gay, Verne, "CBS may tie rates to buying p?", 1988—(Article).

Flanagan, J.L., et al., "Synthetic Voices For Computers", *IEEE International Conferences on Communications*, 1970, pp. 45–9—45–10—(Conference Record).

Rabiner, L.R., et al., "Computer Voice Response Using Low Bit Rate Synthetic Speech", *Digest IEEE 71 International Convention*, Mar. 22–25, 1971, p. 1–2, Fig. 1–2—(Paper).

"DT1000 Digitalker Speech Synthesis Evaluation Board", *National Semiconductor Corp.*, Oct. 1980—(Manual).

"Data Set 407C Interface Specifications Nov. 1977", *Bell System Technical Reference*, Nov. 1977, pp. 1–50 —(Paper).

Broomfield, R.A., et al., "Making a data terminal out of the Touch–Tone telephone", *Electronics*, Jul. 3, 1980, pp. 124–129—(Paper).

Godfrey, D., et al., "The Telidon Book—Designing and Using Videotex Systems", pp. 1–103—(Book).

"Industry Marketing Bulletin", *Honeywell EDP Wellesley Hills*, Aug. 9, 1967.

"Honeywell Communications Configuration Charts And Aids In Designing", *Data Communications*, pp. 3–1—3–7 and A.

"Burroughs Audio Response System", Reference Information for Sales Representatives, pp. 1–6.

"New Product Announcement", *Burroughs Corporation*, Feb. 5, 1968.

"Stand–Alone Lockbox Application Voice Response (Slave) Communication System Functional Specification", *Cognitronics Corporation*, Feb. 19, 1982, p. 21.

"Unlock lockbox reporting. with Cognitronics Voice Response Communications System/Banking.", *Speech–maker a division of Cognitronics Corporation*.

"Voice Response for Banking", *Cognitronics Corporation* (Brochure).

"voice response application brief", *Speech–maker*—(Brochure).

"Instant credit authorization is an easy touch when any telelphone is a voice response computer terminal", *Speech–maker a division of Cognitronics Corporation*—(Article).

Slutsker, Gary, "Relationship marketing", *Forbes*, Apr. 3, 1989—(Article).

Finnigan, P.F., "To Our Shareholders", Jun. 1985, Aprl. 7, 1986, Apr. 10, 1987—(Letters).

Finnigan, P.F., "Our guest", *Radio–Schweiz AG Telekommunikation und Flugsicherung*, Jan. 1983, pp. 12–14—(Bulletin).

Finnigan, P.F., "Voice mail", *1983 National Computer Conference*, May 16–19, 1983, Anaheim, CA, pp. 375–377 and Abstract.

"Conversations in Your Mailbox", *Software News*, Jan. 1985—(Article).

Fredric, Paul, "Voicemail Int'l, Radio Page America To Offer A 'Pocket News Network'", *Communications Week*, Jul. 8, 1985—(Article).

"Voice–Messaging System: Use It While You're In, Not Out", *Information Week*—(Article).

"Corporate Performance—Companies to Watch", *Fortune*, Sep. 30, 1985—(Article).

"Dream Weaver", *Jon Lindy*, Aug. 1986, pp. 32–35, 37—(Article).

"Turn any telephone into a complete electronic message service", *Voicemail*—(Brochure).

"Newsline", *Voicemail International, Inc.*, Oct. 1984 and Nov. 1984.

"Voiceletter No. 1", *Voicemail International, Inc.*, Dec. 1985.

"A New, More Productive Way to Use the Telephone", *Voicemail International, Inc.*—(Brochure).

"While You Were Out . . . "—(Brochure).

"?For People Who Can't Afford to Miss Messages", *Voicemail International, Inc.* —(Brochure).

"Voicemail The electronic news service saves time, money and nerves", *Radio–Suisse Ltd.*, (Voicemail Agent for Europe)—(Brochure).

"Are You Being Robbed of Your Time . . . ?", *Voicemail International, Inc.* —(Brochure).

"Voicemail Instruction Manual B—85", *Televoice International*, Nov. 1980—(Manual).
"Local Telephone Numbers" (for Voicemail) and "Televoice Is As Easy As 1,2,3!", *Televoice International*—(Manual).
"Voicemail Instruction Manual C—25", *Televoice International*, Jun. 1981—(Manual).
"Telephone Numbers" (for Voicemail) and "How To Use Voicemail", *Televoice International*—(Manual).
"Message Receiving/Sending" (and others), *Voicemail International, Inc.* —(Manual).
"You Can Use Voicemail To Send And Receive Messages At Anytime Anywhere In The World", *Voicemail International, Inc.*, 1981—(Brochure).
"Advanced User Guide", *Voicemail International, Inc.* —(Manual).
"Voicemail's Basic User's Guide", *Voicemail International, Inc.*—(Manual).
"Welcome To Dowphone", *Dowphone*, Jan. 1986—(Manual).
"Telephone 1–800 Check–PDR", *Officers of Medical Economics Company, Inc.*, 1986—(Circulation/Brochure).
"Turn your telephone into an effecient electronic mailbox", *Western Union*, Jan. 1984,—(Brochure).
"Western Union Voice Message Service User's Guide", *Western Union*, Jul. 1984—(Brochure).
"PSA's 24 hour reservation system", *PSA*, Sep. 1986—(Brochure).
"To Better Serve Your Business, We're On Call Days, Nights and Weekends.", *Maryland Business Assistance Center*—(Brochure).
"Voice Response: Breaks Trough Call Blockage.", *Business Week*, Aug. 26, 1985—(Advertisement for Preception Technology Corporation).
"Tools for heave hitters", *Forbes*, May 6, 1985.
"The Fidelity Automated Service Telephone", *Fidelity Group*—(Manual/Brochure).
"Stockquote Hotline", *Norwest Brokerage Services*—(Brochure).
"All You Need To Get The Stock Quotes And News You Want." Dowphone, 1984—(Advertisement).
"The Most Respected Name in Telemarketing", *West Interactive Corporation*—(2 Brochures).

Borison, V.S., "Transaction—telephone gets the fact at the point of sale", *Bell Laboratories Record*, Oct. 1975, pp. 377–383—(Article).
Demeautis, M., et al., "The TV 200 A Transactional Telephone", *Commutation & Transmission n° 5*,1985, pp. 71–82—(Article).
Eriksson, G., et al., "Voice and Data Workstations and Services in the ISDN", *Ericsson Review.*, May 1984, pp. 14–19—(Article).
Schrage, Michael, "A Game Von Meister in Pursuit of Profits", *Washington Post*, Sep. 23, 1985—(Article).
Svigals, J., "Low Cost Point–Of–Sale Terminal", *IBM Technical Disclosure Bulletin*, Sep. 1982, vol. 25, No. 4, p.
Turbat, A., "Telepayment And Electronic Money The Smart Card", *Commutation & Transmission n°5*, 1982, pp. 11–20—(Article).
"Voice Mail", *Sound & Communications*, Apr. 1983, vol. 28, No. 12, pp. 84–85—(Article).
Aso, Satoshi, "Trends and Applications of Voice Output Devices", *2209 J.E.E. Journal of Electronic Engineering*, Feb. 1982, vol. 19, No. 182, pp. 102–107—(Article).
Kroemer, F., "Telebox", Unterrichtsblätter, year 38/1985, No. 4, pp. 131–141 (Article)—no translation.
Kroemer, F., "Telebox", Unterichstablätter, year 41/1988, No. 2, pp. 67–83 (Article)—no translation.
C.R. Newson, "Merlin Voice Mail VM600," British Telecommunications Engineering, vol. 4, Apr. 1985, pp. 32–35.
A.S. Yatagai, "Telephonic Voice Synthesis Systems," Telecommunications, Aug. 1985, pp. 56h–I, 68.
A.J. Waite, "Getting Personal With NewTechnologies For Telemarketers," DM News, Feb. 15, 1987 at 50.
"Shopping via a network is no longer just talk," Data Communications, Aug. 1981 at 43.
"Growth–Oriented Systems," Restaurant Technology, Nation's Restaurant News Newspaper, Jul. 1, 1985 at 51.
"Let your fingers do the tapping . . . and the computer the talking," Modern Office Tech., May 1984 at 80.
"American Software unviels systems for IBM mainframes," Computerworld, Mar. 26, 1984 at 59.
"Business Units Get Order Entry," Computerworld, Jul. 12, 1982 at 36.

MULTIPLE FORMAT TELEPHONIC INTERFACE CONTROL SYSTEM

RELATED SUBJECT MATTER

This is a continuation of application Ser. No. 08/306,751, filed Sep. 14, 1994, and entitled "Multiple Format Telephonic Interface Control System", which is a continuation of application Ser. No. 08/047,241 filed Apr. 13, 1993 and entitled "Multiple Format Telephonic Interface Control System", now U.S. Pat. No. 5,351,285, which is a continuation of application Ser. No. 07/509,691 filed Apr. 16, 1990 and entitled "Multiple Format Telephonic Interface Control System", now abandoned, which a continuation-in-part of application Ser. No. 260,104 filed Oct. 20, 1988 and entitled "Telephonic Interface Control System", now U.S. Pat. No. 4,930,150, which is a continuation-in-part of application Ser. No. 018,244 filed Feb. 24, 1987 and entitled "Statistical Analysis System For Use With Public Communication Facility", now U.S. Pat. No. 4,792,968, which was a continuation-in-part of application Ser. No. 753,299 filed Jul. 10, 1985 and entitled "Statistical Analysis System For Use With Public Communication Facility", now abandoned. Also, this application is a continuation-in-part of application Ser. No. 07/640,337 filed Jan. 11, 1991, and entitled "Telephonic-Interface Statistical Analysis System", now abandoned, which is a continuation of application Ser. No. 07/335,923 filed Apr. 10, 1989, and entitled "Telephonic-Interface Statistical Analysis System", which is a continuation of application Ser. No. 07/194,258 filed May 16, 1988, and entitled "Telephonic-Interface Statistical Analysis System", now U.S. Pat. No. 4,845,739, which is a continuation-in-part of application Ser. No. 018,244 filed Feb. 24, 1987 and entitled "Statistical Analysis System For Use With Public Communication Facility", now U.S. Pat. No. 4,792,968, which is a continuation-in-part of application Ser. No. 753,299 filed Jul. 10, 1985, and entitled "Statistical Analysis System For Use With Public Communication Facility", now abandoned.

BACKGROUND AND SUMMARY OF THE INVENTION

Over the past several years, substantial expansion has occurred in the technology of combining telephonic and computer systems. For example, telephone systems have been developed to readily transmit digital data. Various forms of modems are in wide-spread use to intercouple telephones and computers. However, at a more personal level, it also has been proposed to utilize the traditional dialing buttons of telephone instruments to provide digital data, as for various processing. In accordance with such arrangements, voice messages prompt callers to provide data by actuating the alphanumeric buttons of conventional telephones. These systems have been proposed in association with computers to provide various services and one such system is disclosed in U.S. Pat. No. 4,792,968, issued Dec. 20, 1988, to Ronald A. Katz from an application Ser. No. 018,244 filed Feb. 24, 1987.

With respect to telephonic computer systems, attaining the interface format desired by an individual caller is sometimes complex and burdensome. Specifically, callers may be misdirected, screening may be ineffective and delays may be cumbersome. Also, records may be poor or non-existent. Furthermore, some situations exist where interface to a live operator is an important alternative. As a consequence, a need exists for an improved interface system for selectively interfacing a considerable number of individual callers with a multiple format processor, as to attain efficient and economical digital and vocal exchanges along with prompting and data accumulation.

In general, the present invention comprises a telephonic-computer interface system accommodating digital and vocal (analog) telephonic communication and capable of handling a large number of calls to selectively interface prompted live-operator stations or formats in a computer processor. The selected interface is controlled, as by call (called number, calling number, etc.) and can be altered under control of an operator, developed data or operating conditions. Accordingly, the system of the present invention interfaces: (1) a telephonic communication facility including remote terminals for individual callers, e.g. conventional telephone instruments including voice communication means, and digital input means in the form of alphanumeric buttons for providing data and (2) either a prompted live-operator station or a multiple port, multiple format data processor for concurrently processing data from a substantial number of callers with respect to any of several formats.

The interface system incorporates a controller for receiving calls from remote terminals for association with ports in the telephonic computer apparatus, and which receives signal-represented call data (representing "calling" and "called" telephone numbers) along with equipment information. An index apparatus is controlled, as by the signal-represented call data, to select initially a live-operator or machine format of the processor so as to specify any conditions for the interface, at least one of the formats including at least one condition. A test apparatus may determine whether or not an individual call attains specified conditions and thereby controls switching structure for providing the actual interface. If a live-operator terminal is selected, or indicated as a secondary format, prompt data is provided to a select station. Data is recorded and processing procedures also may be controlled by call data.

BRIEF DESCRIPTION OF THE DRAWINGS

In the drawings, which constitute a part of this specification, an exemplary embodiment exhibiting various objectives and features hereof is set forth, specifically.

DESCRIPTION OF THE ILLUSTRATIVE EMBODIMENT

As required, a detailed illustrative embodiment of the present invention is disclosed herein. However, physical communication systems, data formats, and operating structures in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
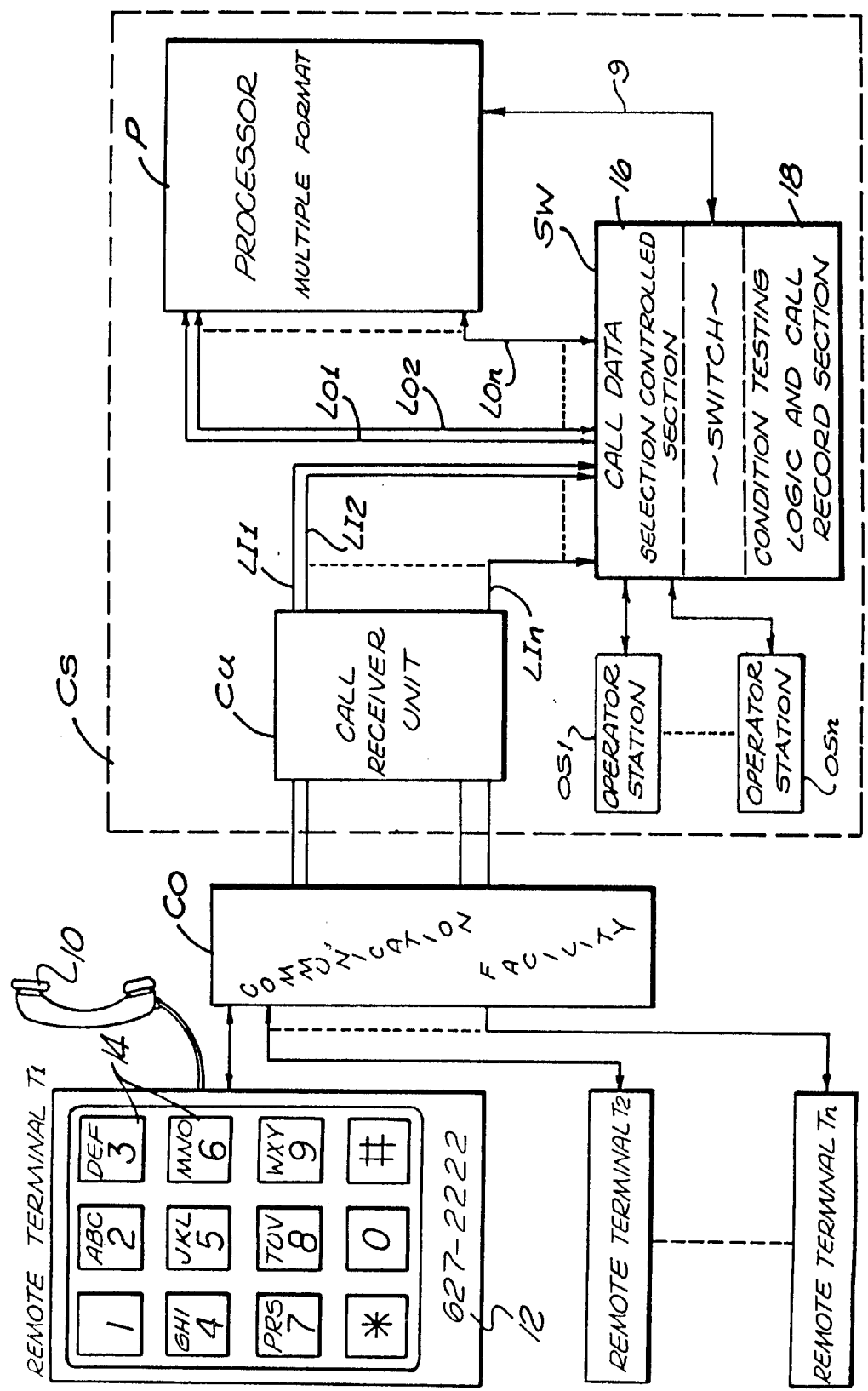
FIG. 1 is a block diagram of a system constructed in accordance with the present invention.

Referring initially to FIG. 1, a series of remote terminals T1–Tn (telephone instruments) are represented (left). The terminals T1–Tn are generally similar and accordingly only the terminal T1 is shown in any detail. The indicated terminals T1–Tn represent the multitude of telephone terminals existing in association with a communication facility CO which may comprise a comprehensive public telephone network.

The communication facility CO, along with the individual terminals T1–Tn, is coupled to a central processing station CS generally indicated by a dashed-line block. Generally with regard to the station CS, individual terminals T1–Tn are interfaced either with a processor P (upper right) or one of several live-operator stations OS1–OSn (lower left) through a call receiver unit CU and a switch SW. Essentially, the processor P and the switch SW cooperate (line 9) to control interfaces, with the processor P providing interface formats either (or both) to automate an interface or prompt a live operator at a station OS1–OSn. Note that the interface formats are stored as described below in the processor P.

In accordance herewith, individual telephone calls are preliminarily processed on the basis of signal-represented call data to identify a specific operating format for a station or the processor P. The preliminary processing may invoke screening tests to impose conditions or establish a test criteria for the switch SW to determine the acceptability of the call to interface with a specific operating format.

Calls are selectively processed according to a specific operating format as indicated by call data. At any instant of time, the collective interface may involve several thousand calls simultaneously being processed through ports of the processor P. Exemplary selected formats of the processor might include: public polls, lotteries, auctions, promotions, sales operations and games. Accordingly, the stations OS1–OSn may comprise a substantial number and the processor P may take the form of a sizable computer capable of simultaneously processing many calls involving several different formats. Although numerous possible configurations are available, for purposes of explanation, the processor P is illustrated simply as a block with multiple ports. Note that while the switch SW and the processor P may be integrated in a single system, they are separately illustrated to isolate the detailed structure and process of the present invention.

Input lines LI1 through LIn from the call receiver unit CU enter the switch SW to provide calling data and communication paths. Output lines LO1 through LOn function between the switch SW and the processor P as lines LS1–LSn operate to serve the stations OS1–OSn. Note that various multiplexing techniques are well known in the telephonic art to communicate call data and may be employed in the system.

Considering the system somewhat summarily, individual calls originating at the terminals T1–Tn are coupled through the communication facility CO and the call receiver unit CU to the switch SW. Call data, representative of calls, actuates the switch SW to preliminarily process each call based on the desired format. For example, depending on the desired format (indicated by the called number and/or the equipment data signals) calls are selectively coupled and processed. Furthermore, record data is assembled for storage.

Considering the system of FIG. 1 in somewhat greater detail, the exemplary telephone terminal T1 includes a handpiece 10 (microphone and earphone) and a panel 12 provided with a rectangular array of push buttons 14 in a conventional configuration. Of course, the handpiece 10 accommodates analog signals while the panel 12 is a digital apparatus. Generally, the handpiece 10 serves to manifest analog or voice signals to a caller.

In accordance with conventional telephone structure, alphabetic and numeric designations are provided on the buttons 14. For example, several of the buttons 14 carry three letters along with a decimal digit. Specifically, the button designated with the numeral "2" also carries the letters "A", "B" and "C". Thus, the buttons 14 encompass the numerals "0–9" two symbols, and the alphabet except for the letters "Q" and "Z". Consequently, the buttons 14 substantially accommodate the entry of decimal and alphabetic data.

At this stage, some specific aspects of the communication facility CO are noteworthy. Essentially, with telephonic dialing, the communication facility CO couples selective terminals (from the multitude of terminals T1–Tn) to the call receiver unit CU. In that regard, the unit CU at the central station CS may be reached by any of a plurality of called numbers. For example, the call unit CU might be reached by any of twenty telephone dialing numbers, each associated with a specific operating format of the processor P. One called number or set of numbers might be associated with an auction format of the processor P. Another number or set of numbers might be associated with sales operating formats. Still another called number or set of numbers might identify a game format, and so on.

Incoming calls to the call receiver unit CU are identified by call data in accordance with telephone system techniques. As described below, the call data may specifically include digital signals representative of the called number (DNIS), the calling number (ANI) (terminal number), and the terminal equipment.

In addition to attaining a preliminary interface with a selected format, individual calls may be screened based on the called number (identifying an operating format) and the calling number (caller identification) or the equipment. That is, the system of the present invention is based on a realization that signal-represented call data can be effectively utilized to selectively interface individual callers at remote terminals with specific operating formats of a data processor.

Considering the call data in somewhat greater detail, in accordance with current telephone systems, the communication facility CO may provide signal-represented call data for: the "called" number, the "calling" number, and the equipment involved, e.g. "pulse" or "tone" terminal. Specifically, operating telephone equipment termed "DNIS" automatically provides the called telephone number in digital form from the communication facility CO. Somewhat similarly, existing telephonic equipment designated "ANI" automatically indicates the caller's (calling) number in digital signal represented form. Generally, time shared lines carry such call data and also may provide call data indicating equipment. Thus, the call unit CU may receive the called number, the calling number, and a calling equipment designation (pulse or tone), collectively termed call data, which data is utilized to establish control functions, as for example to select an operating format for a station OS1–OSn or the processor P.

As described in detail below, call data is registered in the switch SW to perform distinct control operations. Specifically, a selection section 16 of the switch SW identifies a specific desired format for the stations OS1–OSn or the processor P. Depending on the format, a testing section 18 of the switch SW may screen calls for interface connections.

Recognizing that the possibilities are great, formats for calls in accordance with the disclosed embodiment may be of three different classes. Specifically, call formats may specify any of the following operations:

1. couple to live operator station if possible or in accordance with a predetermined criteria; if no operator station available, couple to processor;
2. interface to processor;
3. either above format, but selectively re-couple to live operator station or processor depending on secondary conditions.

The ramifications of individual formats within the above classes may vary considerably; however, some examples will illustrate possibilities. A marketing format (class 1) might interface callers to a live operator if an operator is available. Upon receiving a call, the operator station OS1–OSn (FIG. 1) also receives and displays prompting format data for the attending operator. If an operator is not available (all stations OS1–OSn busy) the system provides an interface with the processor P and a format as to record the data for a return call by an operator. Alternatively, the processor completes the transaction with data provided by the caller that may be digital, digital and voice, or voice.

In a game format, say of class 2, a caller may be limited to interface the processor P. the interface may be contingent on initial test conditions, e.g. call data, caller record, time, etc.

Formats of class 3 involve a switch between live operator and processor depending on secondary conditions. For example, a polling format may switch from the processor P to an operator station OS1–OSn if the caller fails to provide digital data in a responsive form. Alternatively, an operator may command a switch to the processor P upon identifying a specific caller from whom data is to be taken.

Figure 2:
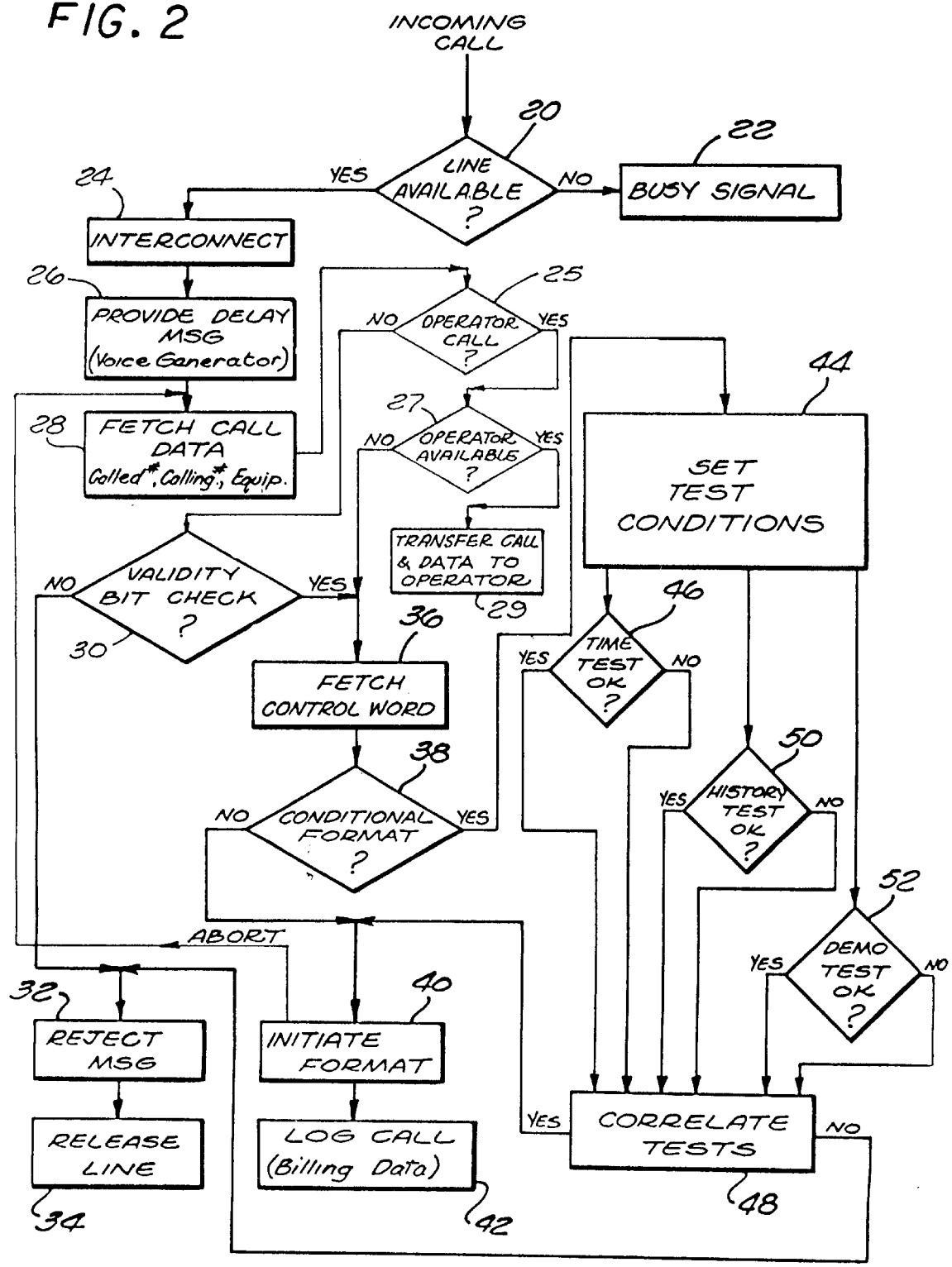
FIG. 2 is a flow diagram illustrating the operating process of the system of FIG. 1.

In the illustrative system of FIG. 1, an operating process is executed as illustrated in FIG. 2. Each incoming call prompts a preliminary query as indicated by a block 20 concerning the availability of a line or port. In the absence of an available line, a busy signal is provided as indicated by the block 22. Alternatively, an available line results in a preliminary interconnect as indicated by a block 24 setting a conditional connection into operation.

As indicated by a block 26, during the screening or testing interval (typically measured in seconds or fractions of seconds) the caller remains on line and may receive a message. That is, the caller might hear silence or may continue to hear the traditional telephonic ringing sound. Alternatively, the caller might be given a brief vocal message to "stand by" as indicated by the block 26. In any event, the caller is held "on line" while the process continues.

With a call on a line, the communication facility CO (FIG. 1) provides signal-represented call data, e.g. the called number, the calling number, and the equipment designation. As indicated by block 28 (FIG. 2) signals representative of the call data are captured to perform preliminary control and processing operations as will now be considered. Note that the selected formats will fall within one of the classes as stated above.

The initial test is illustrated by a query block 25 representing an operation to distinguish calls of class 1 (operator) and class 2 (processor). Calls for a format seeking an operator prompt a "yes" response from the block 25 and proceed to the test of a block 27, "is an operator available?"

A "yes" determination advances the process to an operation indicated by a block 29. Specifically, the block 29 represents the operations of coupling a caller to an operator station and transferring the appropriate format data to the station for prompting the operator. If no operator is available (block 27) the process proceeds with automated control to attain an interface in accordance with an appropriate format. Specifically, a control word is fetched (block 36) to establish an operating format for interfacing the call. In that regard, the specified format may be very simple. For example, the call simply may be prompted to indicate identification for a return call. Alternatively, the format may incorporate conditions or other complications as explained below.

Returning to the query block 25, if the call is to be coupled to the processor, an initial test operation is indicated by a block 30. A validity test is performed, for example, a list of calling numbers may be compiled that are to be denied access to any interface with the processor P. Negative calling numbers may result either by the choice of the person responsible for the calling number terminal, or by the choice of the service operating the processor P (FIG. 1). For example, an accumulation of prior improper transactions from a terminal designated by a specific telephone number may provide a basis for complete disqualification. Equipment also may disqualify.

Recognizing that various circumstances may be involved with respect to the total disqualification of a calling terminal, in accordance herewith the test involves formulation of a validity bit as indicated by the query block 30. Acceptable calls set the validity bit at a binary "1".

If the calling terminal is invalid, ("no" from the block 30) the call is rejected as indicated by the block 32 with or without a message and the line is released as indicated by the block 34. Note that the time interval involved is very short and the rejection message may take various forms including a verbal comment, a busy signal or simply a disconnected signal.

If a positive validity bit ("1") is formed at the junction of the query block 30, a control word is fetched under command of the called number as indicated by the block 36. As described in detail below, a control word is available for each operating format of the processor P and is utilized to impose the conditions for an interface and the terms of any associated billing.

As indicated in FIG. 2, the fetched control word of the block 36 prompts an inquiry as to the conditions attendant the selected operating format as indicated by a query block 38. That is, in the process, the query of block 38 determines whether further conditions are imposed for attaining interface with the processor P. If no further conditions are imposed, the format is initiated by pursuing the connected interface as indicated by a block 40. Also, as indicated by a block 42, the call is logged or recorded as with respect to billing data for example.

If access to a format involves conditions ("yes" from the query block 38), tests are specified as illustrated by a block 44. That is, conditions for the interface are specified by the block 44. Of course, the specific tests may involve various criteria; however, in the illustrative embodiment, the conditions involve time, history and demographics. Each exemplary condition will now be considered somewhat preliminarily.

In the disclosed embodiment, time tests involve testing the time of the call against certain limitations. For example, it may be desirable to limit some formats to specific time intervals as in relation to a television broadcast, a real time auction and so on. Note that the time tests also may be related to specific terminal control and geographic areas treated on the basis of telephone area codes. Specific examples will illustrate.

Assume an operating game format that propounds questions to a caller based on knowledge of a particular television program. The program may be broadcast at different times in different geographic areas, and as a consequence it may be desirable to limit calls interfacing the processor format depending on the area code of calling numbers. Accordingly, time tests may involve solely the instant time, or various combinations of time and call data. The specific test is determined as indicated by a block 46 (FIG. 2) imposing detailed operating instructions for the format. The test results are then correlated as represented by a block 48.

As indicated above, in accordance with the described embodiment, another test involves a record as for example directed to the station identified by the calling number. As an example, the record might take the form of either a negative or a positive file (for an individual format). In that regard, all formats involving "pay to dial" (e.g. 976, 900 etc.) calls might be conditioned as a group. Generally, in the case of a negative file, certain numbers are recorded that are to be denied access to a particular operating format. In the case of a positive file, access to the operating format is available only to calling numbers listed-in the file.

Considering exemplary implementations of the system, a negative file may be based on limited or restricted use (as in the case of a lottery) or prohibitive use (telephone terminal owner choice). Formats accessible on a "one-time only" basis also may be controlled by negative lists. Thus, an operating format may be inaccessible to a terminal, or may be accessible a specified number of times during a specified interval, e.g. three accesses per week. The historical test is symbolized in FIG. 2 by the query block 50 to conditionally actuate the related tests as indicated in the block 48. History limitations also may involve purely format limits. For example, a give-away or dial-free format may be limited to some predetermined number of calls for a period, e.g. ten thousand calls per day. Thus, limits can be imposed on the economic exposure of a format.

Moving from the historic considerations, demographic tests may be specified as in relation to the geographic area manifest by the area code of the calling number. To consider a specific example, a public opinion poll may be conducted in which a particular geographic balance is defined. In such an operating format, calls may be accepted only until particular quotas are attained with respect to specified area codes. Such tests in the process are indicated by the query block 52, again to instruct the correlation block 48.

With the requisite tests established by selection of a format, the block 48 indicates resolving the acceptability of the call for the selected interface format. If the call is accepted, the process moves to initiate the selected format interface as indicated by the block 40. Conversely, if the call is to be rejected, the process moves to the step indicated by block 32, i.e. reject the call as with a message and release the line.

If a call is accepted, as represented by the block 40, there is a possibility that an established format may be aborted in favor of a different format. For example, interfacing the processor P, a qualified caller may fail to communicate digitally with the result that transfer to a live operator is commanded. Also, in certain situations, a connection to a live operator is to be terminated in favor of an interface to the processor. In either event, an existing format is terminated in favor of a fresh format. That phase of the process is illustrated by an "abort" line from the block 40 returning to the block 28. Thus, the process returns to re-assign the caller to a new format in accordance with fresh data. Thus, transfers according to class 3 operation are implemented along with the other classes of operation by the switch SW (FIG. 1).

Figure 3:
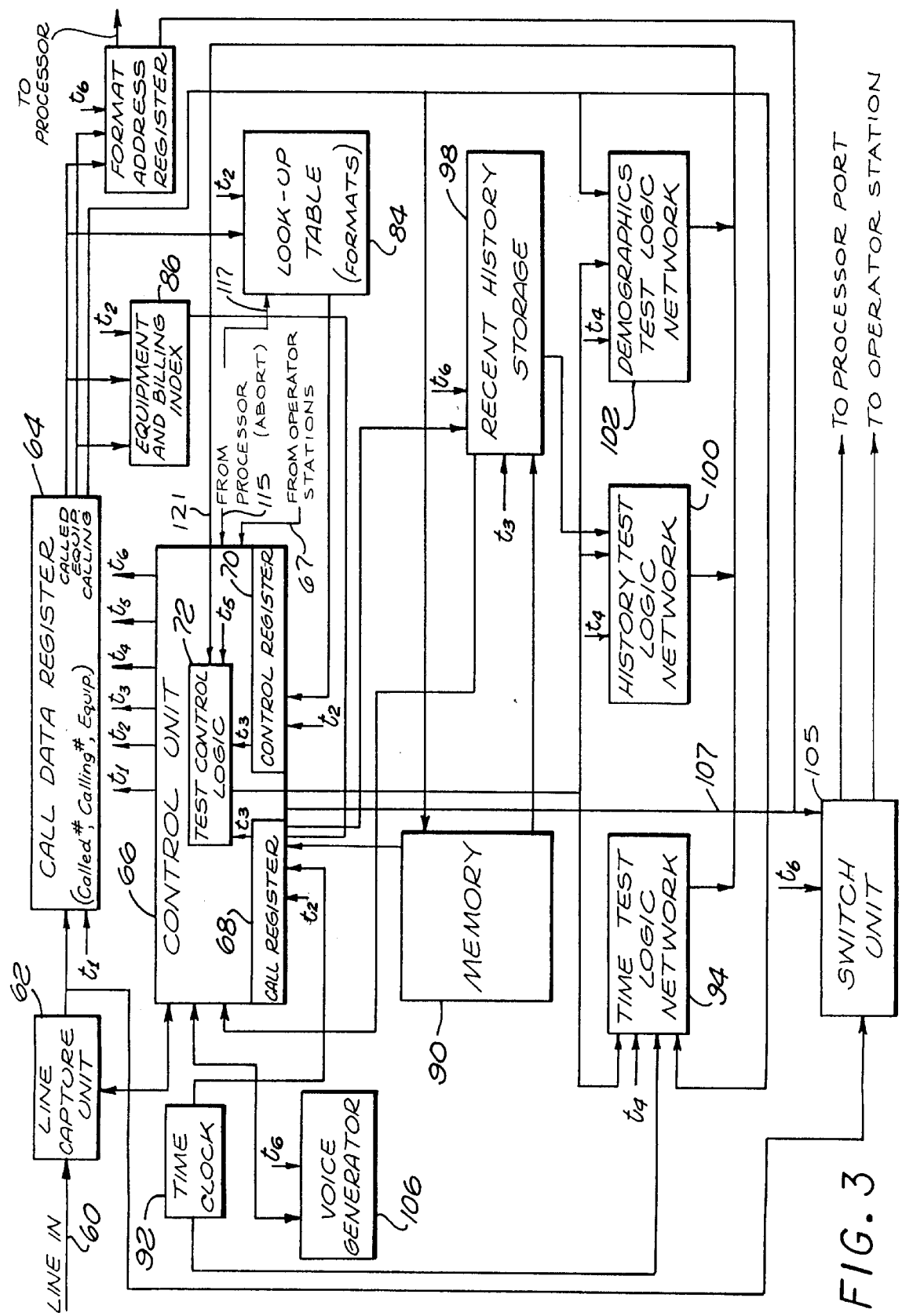
FIG. 3 is a block diagram of a component portion of the system of FIG. 1.

An exemplary detailed structure of the switch SW (FIG. 1) for executing the process of FIG. 2 is represented in FIG. 3. In that regard, individual telephone calls are manifest from the call receiver unit CU (FIG. 1) comprising existing equipment as well known in the prior art. The call data is supplied through a line 60, upper left, FIG. 3. Note that the represented single line 60 is merely symbolic of a channel to carry call data and provide direct telephone communication.

Generally, the system of FIG. 3 illustrates elements of the switch SW of FIG. 1 for processing an individual call. As indicated above, the system of the present invention involves the simultaneous processing of many calls with the possibility that numerous calls are simultaneously being tested for a connection as explained above. Consequently, although the system of FIG. 3 is illustrated with respect to testing a single call, it is to be understood that sequential or parallel operations and multiplexing techniques, as well known and widely practiced in the computer field, are utilized to accomplish multiple processing operations as are described below with reference to FIG. 3.

The line 60 (FIG. 3, upper left) enters a line capture unit 62 through which signal-represented call data is supplied to a call data register 64. Accordingly, the call data is registered to be available for processing operations as explained generally with reference to FIG. 2.

The line capture unit 62 also is connected to a control unit 66. Structurally, the control unit 66 may take the form of various computer facilities incorporating memory and logic capability to sequence and control specific functions as explained below. Generally, the control unit 66 implements specific formats which may involve coupling a caller either to a live operator station OS1–OSn or to the processor P. In that regard, the control unit 66 provides a series of timing signals t1–t6 to sequence the operations of individual component blocks as illustrated. Note that to preserve clarity in FIG. 1, connections of timing signals t1–t6 are not illustrated. Also, the control unit 66 is connected to the operator stations OS1–OSn (line 67) to receive signals indicative of the availability of stations.

Figure 4:
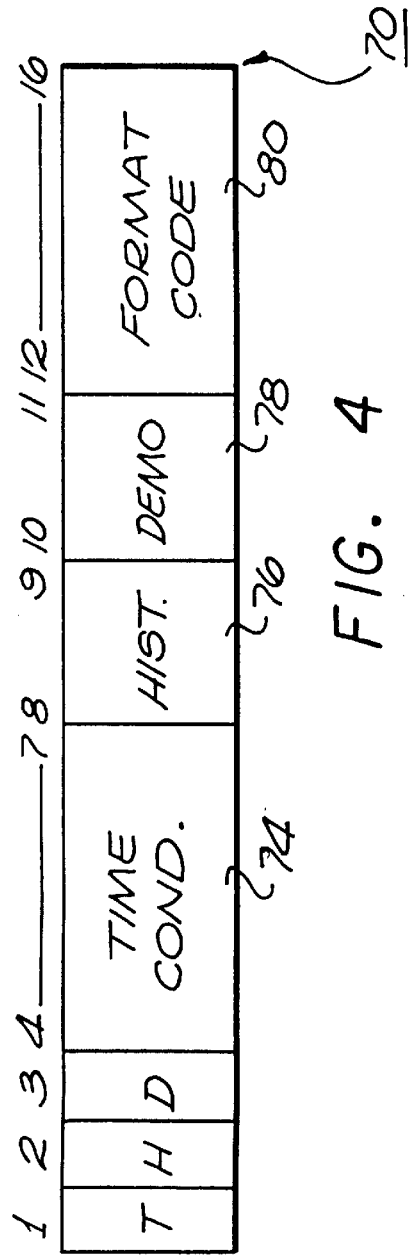
FIG. 4 is a diagrammatic representation of a binary control word as registered and utilized in the system of FIG. 1.

In addition to logic for controlled switching as described, the control unit 66 specifically includes a call register 68, a control register 70 and test control logic 72. The control register 70 receives format control words specified, as by the called number and having a form as illustrated in FIG. 4.

Recapitulating, each of the operating formats has a control word for defining any access conditions or limitations to accomplish a specific format, e.g. connection to an operator station OS1–OSn or to the processor P (FIG. 1). The formats may vary considerably; however, a few examples are the following:

Class 1, connect the live operator if available and provide prompt data for the XYS Company telemarketing program, if operator not available, cue caller: "All operators are busy at the moment, but we will return your call as soon as possible. Please touch your telephone buttons '2' and '4' to identify yourself as twenty-four for the return call".

Class 2, couple qualified callers to computer P for polling interface.

Class 3, couple callers to computer P for the RST Company telemarketing program, however, transfer to live operator (and prompt) if caller is not responsive.

These formats are established by control words that are selected on the basis of call data. The control words are sixteen bits, illustrated as the first sixteen bits (1–16) registered as shown in FIG. 4. An additional group of registered bits (17–20) are provided from call data.

The initial three registered bits in the control register (FIG. 4) serve as test command bits respectively for a time test, a history test and a demographics test. The presence of a "1" bit in any of the first three bit locations specifies the requirement for testing compliance to specified conditions. A "0" bit indicates no test.

The bits "4 through 7" in the control register constitute a field 74 and specify time conditions in relation to the instant time of the call. The field 74 may specify eight distinct time conditions. For example, exemplary specified conditions for a format might be as follows:

Accept calls between 7:00 and 18:00,

Accept calls on Thursday between 9:00 and 10:00,

Accept calls from area code 213 on Wednesday between 15:00 and 16:00,

Accept calls from area code 602 on Wednesday between 16:00 and 17:00.

Essentially, the time condition field 74 (activated by the time bit "1"—first bit position) defines specific intervals during which calls will be accepted for the specific called number and may be further limited by the area codes. A wide range of possibilities are available to accommodate specific programs for individual formats.

A field 76 in the control register embraces bits "8" and "9" and defines the conditions for access to the format based on historical considerations. Thus, two bits are provided to indicate four possible historical limitations. Again, the test is specified by a "1" bit, in this instance in the second bit location of the register 70. The following limitations are exemplary of many possibilities as related to a single telephone number:

Accept one call per day (per caller),

Accept one call per week (per caller),

Accept one call per month (per caller),

Accept one call during any three-day period (per caller),

Accept only 10,000 calls (per format).

continuing with respect to the contents of the register 70, as illustrated in FIG. 4, bits "10" and "11" constitute a field 78 specifying demographic test limitations. Again, a few examples will illustrate the various possibilities:

Accept calls only from area code 213,

Accept calls from area codes 213, 818 and 619,

Accept only 1,000 calls from area code 213,

Accept calls from area code 213 with the prefix numerals 619.

Again, the demographic test is imposed only upon the existence of a "1" bit, in this instance in the third bit of the control word. As in the other cases, specific possibilities are considerable.

The bits "12" through "16" of the control word constitute a field 80 and designate a selection code for the identified format. These five bits enable a substantial number of formats to be designated and coded with respect to various classifications. For example, calls of the class 1 specifying a desirable connection to a live operator station OS1–OSn might be encoded in a "000" decimal series, e.g. "001" indicates XYZ Company telemarketing program, "034" indicates RST Company program, and so on. Accordingly, a "0" in the most significant digit specifies a live operator format. Similarly, lottery formats might be encoded in a "100" decimal series, e.g. "101, 102, 103- - - 110, 111, 112"- - - and so on; auctions might be designated in a "200" series, e.g.: "201, 202, - - - ". By using decimal equivalent coding formats for various categories, exclusions may be concisely stated. For example, a calling number may be excluded from all lottery operating formats simply by the specification of decimal "100" in association with the calling number.

The data, as illustrated in FIG. 4 is loaded into the control register 70. Again, the first sixteen bits comprise the format control word and are provided from a look-up table 84 (FIG. 3, right, central) upon being addressed by call data from the register 64.

The last bits (bits 17–20) stored in the control register 70 are provided from an equipment and billing instruction index 86. That is, in response to the signal-represented call data indicating the called number and the equipment, the look-up table 84 and the index 86 supply data for loading the control register as indicated above.

Figure 5:
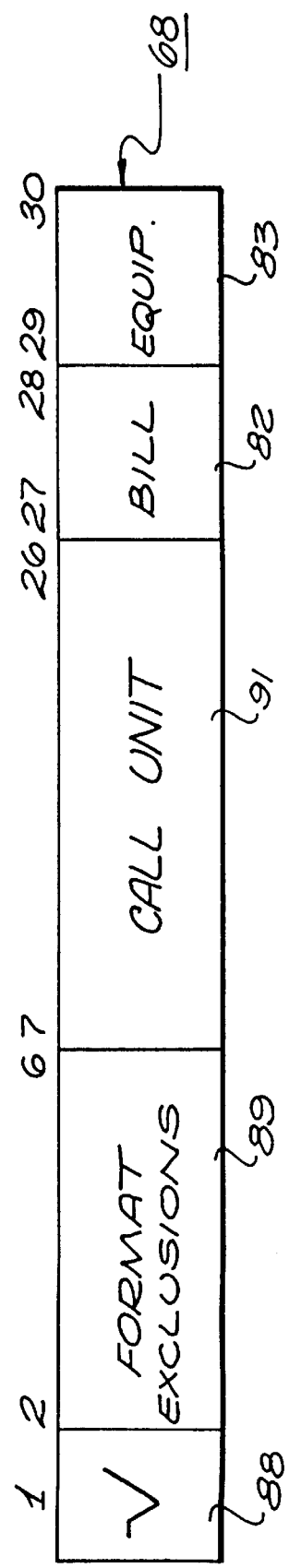
FIG. 5 is a diagrammatic representation of a binary data record word as utilized and recorded in the system of FIG. 1.

While the control register 70 is loaded to specify the operation of the system, the call register 68 in the control unit 66 receives signals for additional control and to formulate a record of the call. Specifically, as represented in FIG. 5, the contents of the call register 68 includes an initial validity bit 88 for indicating that the calling number is either on a positive list or is not on a negative list. The determination of the validity bit for location 88 is made by reference to a memory 90 (FIG. 3, central) addressed by the calling number.

While the calling number addresses data to indicate a validity bit, specific format exclusions also may be indicated as explained above with respect to certain formats. For example, certain classifications of formats or specific formats (as a lottery) may be identified as inaccessible for certain telephone terminals as identified by calling numbers. Other than lottery formats, certain discretionary formats also may initiate control to limit access. Accordingly, a field 89 in the call register 68 (FIG. 5, bits "2" through "6") is provided from the memory 90, addressed by the calling number to specify format exclusions. That is, the calling number addresses the memory 90 to load the field 89 and specify limitations. Consider a few examples of format exclusions or limitations for a calling number:

No lottery formats,

One lottery format per week,

Two lottery formats per month of total cost under $25.00,

No auction sales,

Auction sales only with caller entered code I.D. 763.

Again, it will be apparent that many possibilities exist in applying various coding techniques, the above merely being exemplary. Also, as indicated above, a format may be void of any limitations or restrictions. In that event, as explained above, a connection or interface is promptly commanded by the format code.

The bits "7" through "26" stored in the call register 68 (FIG. 5) constitute a field 91 and indicate the time of a call. Signals representative of the instant time of a call to load the field 90 are provided from a time clock 92 (FIG. 3, upper left). Signals from the time clock 92 may be in a Julian code and are provided to the call register 68 and also to a time test logic network 94 (lower left).

The last bits (27–30) in the register 68 are provided from the call data. The bits "27" and "28" indicate format billing data and comprise a field 82. Again, representations are coded; however, with respect to the field 82 information is derived from the called number. For example, an "800"

called number may indicate no billing with the representative code being stored in the field 82. As another possibility, a "976" prefix number, or "900" number, may indicate a specific charge in relation to the identified format.

The bits "29" and "30" comprise a field 83 and may actuate a special form of the selected format. In the disclosed embodiment, the field 83 registers call data, as to indicate that the calling terminal is a "pulse" (rotary dial) signal unit or a "tone" (touch) signal unit. In the instance of a rotary terminal, the format program may be modified to accommodate "pulse" signal operation or inject operator communication with a transfer to one of the stations OS1–OSn.

Recapitulating to some extent with regard to the composition of the call record word in the register 68 (FIG. 5), the memory 90 (FIG. 3) is addressed by calling number data to provide data for the validity bit location 88 and the format-exclusion field 89. The time of call is stored in the field 91 from the clock 92. The billing and equipment data are provided by the index 86 in response to "calling" data signals.

Another element of memory, specifically, a recent activity storage 98 (FIG. 3, lower right) is separately illustrated for convenience of explanation. Essentially, the storage 98 receives words from the call register 63 to maintain a record of interface calls. The recent activity storage may periodically be purged to permanent storage if desired. Thus, the recent activity storage 98 accumulates an activity record of all interface participants with respect to specific formats and is utilized in the history test for determining that an instant calling terminal is within the specified historical limitations as provided from the memory 90.

The activity tests are performed by a history test logic network 100 (FIG. 3, lower central). In a related context, the demographics test as explained in detail above is performed by a demographics test logic network 102. The results of the test logic networks are communicated to the test logic 72 in the control unit 66. As a consequence, a switch unit 105 is actuated to either operatively couple the line 60 into a port of the processor P (FIG. 1) or reject the call. If a call is accepted for an interface, a signal is supplied from the test control logic 72 through a line 107 to the switch 105 during the interval of the timing signal T6. The signal in the line 107 also is supplied to a format address register 109 for addressing the processor P. The register 109 stores select data signals to address a specific operating format of the processor P.

Recapitulating to some extent, call data indicates an interface format of the processor P (FIG. 1) with associated limitations, conditions and billing provisions. Call data also indicates possible format limitations or conditions for a calling, number. The system processes the data with respect to the conditions and limitations to selectively enable interface operations. Essentially, the call data specifies a format (processor or operator) and any conditions relating to the format. Representative data accordingly is provided from the look-up table 84 and the memory 90 to the control register 70 and the call register 68 respectfully. Preliminary conditions may or may not be involved; however, qualified calls for an operator involve tests of availability within the control unit 66 according to data received from the stations OS1–OSn (line 67). As a result, calls are either interfaced to an operator who receives a format prompt, or interfaced to the processor according to a specified format. Thereafter, a shift may command a redetermination and a transfer as described in detail below.

In view of the above structural and logic description of the system of FIG. 3, the process as described with respect to FIG. 2 and the stored control word forms as described with respect to FIGS. 4 and 5, a comprehensive understanding of the described embodiment may now best be accomplished by assuming an exemplary call and treating the individual responsive steps. Accordingly, assume the occurrence of a call as manifest on the line 60 (FIG. 3, upper left). Further, assume that the called number, "976 513 7777" designates a lottery format with limited access. Details of the limited access will be treated below.

Upon occurrence of the call, the line capture unit 62 seizes a line relationship and signals the control unit 66. Immediately, an interval of time signal t1 is initiated and the register 64 is loaded with the called number ("900 513 7777"), the calling number ("415 318 4444") and the equipment designation (tone or no tone). To the caller, the operations as now described involve an almost imperceptible delay.

During the following interval of timing signal t2, the call register 68 and the control register 70 are loaded as illustrated respectively in FIGS. 4 and 5. Specifically, the called number and equipment designation specify data to load the control register 70. The calling number ( "415 318 4444") from the register 64, prompts the memory 90 to load the validity bit 88 and the format exclusions in the field 89 of the register 68. Concurrently, the time clock 92 loads the field 91 with signals representative of the current time.

If the call register 68 does not receive a validity "1" bit, the calling number is indicated to be barred with a consequence that the line is released by the control unit 66. In that regard, a voice generator 106 (FIG. 3, left central) may be actuated by the control unit 66 branching to the operation of timing signal t6. Accordingly, a message of denial may be provided on the line 60 prior to release of the line. Note that the voice generator 106 may be variously used to prompt or inform callers in certain preliminary selection operations supplemental to the specific operations disclosed below.

As indicated above, concurrently with the loading of the call register 68 (timing signal t2), the control register 70 also is loaded. Specifically, from the register 64, the called number cues the look-up table 84 to fill most of the control register (bits "1" through "16", FIG. 4). The fields 82 and 83 are supplied from the index 86.

That is, distinct from the fields loaded into the control register 70 from the look-up table 84, the fields 82 and 83 are supplied from the index 86. In that regard, assume the called number (area code 976) indicates that the charge for the service of the call will be billed through the caller's telephone records. Assume that the field 83 indicates a "tone" terminal effective for a conventional digital interface.

At this point, some still further assumptions will be made to pursue the explanation of the detailed operations. Specifically, assume that the format specified by the called number ("900 513 7777") is a lottery format and includes limitations with respect to time, history and demographics. Accordingly, the initial three bits of the control word all will be "1" bits in the control register 70.

Assume further that the time conditions specified by the field 74 (FIG. 4) limit calls from area code 415 to days other than Sunday. Assume that the history field 76 of the control word imposes a limitation of one call per day per calling station. Assume that the demographics field 78 excludes any call from area codes "512 ", "412 ", "812", - - - (not "415"). Finally, assume the selected format (field 80) designates a specific lottery format, that is lottery "128".

In addition to registration of the data sets detailed above, because a history test is specified, the recent history storage 98 is cued during the interval of timing signal t3. The operation is through the memory 90 by the control unit 66 to prompt the supply of historical data (previously registered record words) for the telephone terminal designated by the calling number ("415 318 4444"). Specifically, during the interval of timing signal t3, the storage 98 supplies data on the calling number to the history test logic network 100. Such data is compiled into a test format as to indicate the number of calls per day, per week, and so on. Note that aggregate call totals may also be supplied as a test criteria. Thus, the control unit 66 coordinates the test criteria data preparatory to the test operations of the individual logic networks 94, 100 and 102.

To summarize, in accordance with the above assumptions, the test control logic 72 is set up to coordinate the following specific logic tests:

Time limitation test by network 94: accept calls from area code 415 except on Sunday, History limit test by network 100: accept only one call per day per station, Demographics test by network 102: accept no calls from area codes 512, 412, 812 - - - (415 not listed).

As explained above, in addition to the limitations specified, in relation to the format, further limitations may be specified by the calling number. Such limitations are specified by the field 89 in the register 68 (FIGS. 3 and 5). In the instant example, assume that according to the record word, participation in the lottery format is limited to the interval between 10:00 a.m. and 3:00 p.m., e.g. when minors are in school. The code for such a format is supplied during the interval of timing signal t3 from the field 89 of the call register 68 to further establish the set-up of the logic 94 acting through the test control logic 72.

Recapitulating with regard to the test control logic 72, essentially a program is defined imposing each of the limitations that are specified by the call data in sufficient detail that comparison tests are expediently performed by the networks 94, 100 and 102. It is stressed, as indicated above, that the tests are selectively performed only in the event a "1" bit appears in the representative first three bit locations of the control word format. In the illustrative example, all the tests were commanded and accordingly the test control logic 72 sets up the condition for tests to be performed by the networks 94, 100 and 102, all during the interval of timing signal t3. Of course, the specific example represents one possibility of a substantial number of programs that might be specified to the system.

Figure 6:
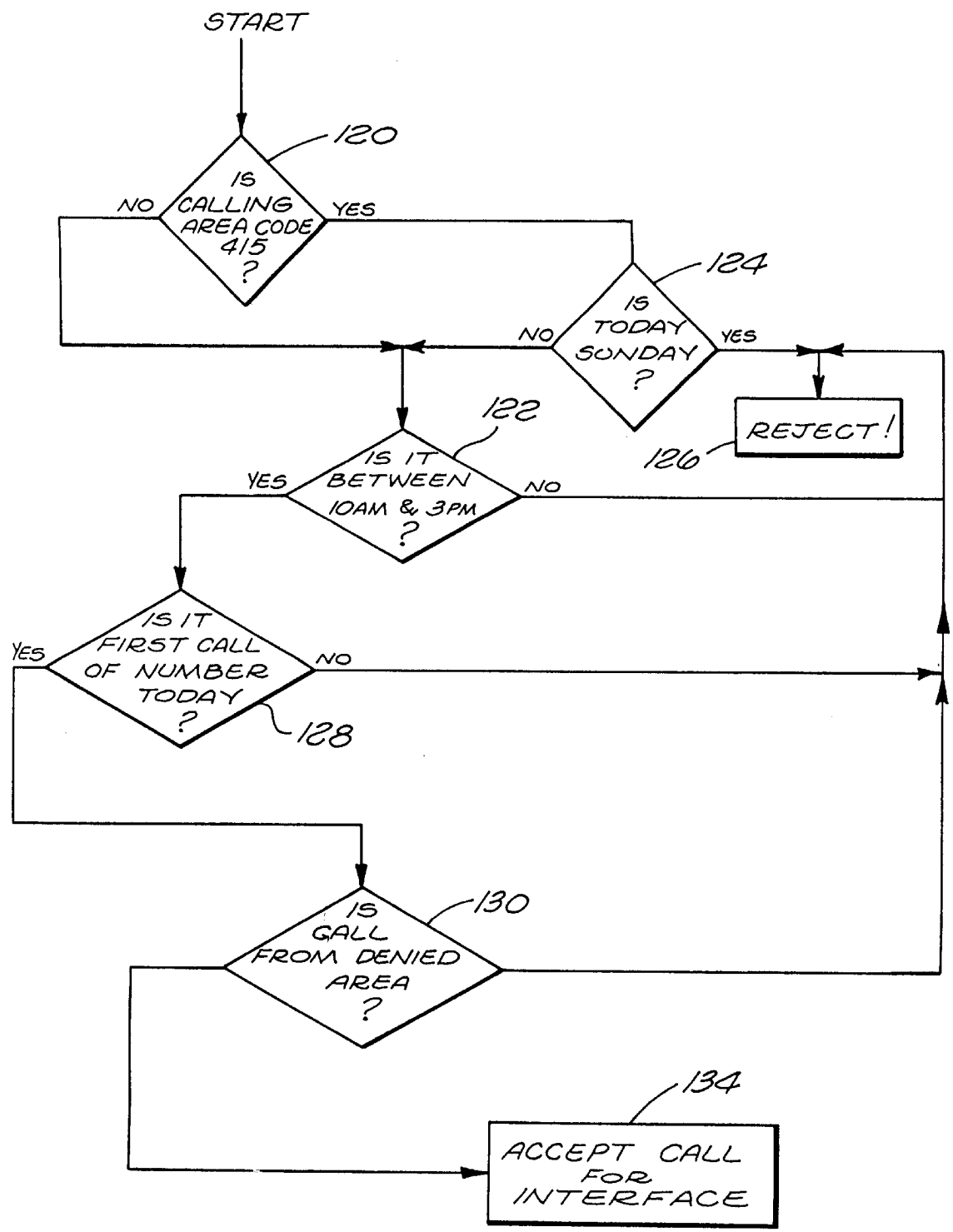
FIG. 6 is a flow diagram illustrating the operating process of the structure represented in FIG. 5.

With the test formats established in the test control logic 72, the logic networks 94, 100 and 102 are driven during the interval of test signal t4 to execute a program in accordance with the assumed example. The process may be variously implemented in logic using well known techniques and is detailed in FIG. 6. Consider the time test of the network 94. The time test logic network 94 approves an interface only if: the call is not from area code "415" on a Sunday and furthermore the call occurs between the hours of 10:00 a.m. and 3:00 p.m. As indicated in FIG. 6, a decision block 120 resolves the area-code "415" time test. If the area code is not "415", the logic proceeds to the next query block 122. Alternatively, if the area code is "415", the day must be tested against Sunday as indicated by the query block 124. An affirmative indication from the Sunday test of block 124 prompts a rejection as indicated by the block 126.

If the Sunday test of block 124 is passed, the program imposes another time test, that is the time-of-day test as indicated by the block 122. Again, a negative result prompts a rejection; however, a positive result involves the next step as indicated by the block 128.

Note that the operations designated by query blocks 120, 122 and 124 are performed by the time test logic network 94 (FIG. 3). The next test of the block 128 is performed by the history test logic 100. The block 128 (FIG. 6) involves a determination of whether or not the instant call is the first for the calling terminal on the instant calendar day. If not, the limitations are exceeded and the call is rejected. If the test is passed, the process next involves the demographic test logic network 102 (FIG. 3) to determine whether or not the call originated from an excluded area based on the calling number area code.

Area controls are illustrated by the query block 130 of FIG. 6. Specifically, the demographics test logic network 102 determines whether or not the current call is from a denied area. If so, the call is rejected as indicated by the block 126. Alternatively, if the area is not excluded, as illustrated by the block 134 in FIG. 6, the interface is accepted. In the instant case, the area "415" is acceptable.

In the operation of the system as illustrated in FIG. 3, the logic networks 94, 100 and 102 indicate test results to the test control logic 72 during the interval of the timing signal t5. The logic 72 correlates the test result for action by the control unit 66. If the imposed conditions are met (or if there are no conditions) the control unit 66 act tates the switch unit 105 and the address register 109 through the line 107 to perfect the interface from the line 60 (upper left) to either a port in the processor P (FIG. 1) or one of the operator stations OS1–OSn. Essentially, the switching operation occurs during the interval of the timing signal t6. Concurrently, the address register 109 specifies the select operating format as stored in the processor P for direct use in an interface with a caller, or to be retrieved and supplied through the switch SW to prompt an operator at a station OS1–OSn.

Also during the interval of the timing signal t6, the contents of the call register 68 is stored in the recent history storage 98. Note that billing data is stored with the call words and may be selectively extracted from the storage 98. At the termination of the timing signal t6, the interface endures until there is a "disconnect" or an "abort".

If the processor P senses the existence of conditions specifying a shift between a processor interface and a live operator communication, the control unit 66 is actuated as indicated through line 115. Note that the abort signal is formed either in response to predetermined conditions in an interface with the processor P, or on command from an active operator station. The signal is also supplied to the look-up table 84 which becomes active if a transfer is conditional. That is, if a transfer is conditional, the tests as described above may be invoked. Conversely, if the transfer is unconditional, the control unit 66 simply actuates the switch 105 to make the change and prompts the format address register to establish the desired format or prompt pattern for an operator.

The formats may involve various records, however, in accordance with the system of the present invention affords considerable flexibility to program individual conditions and limitations for each interface format based on the call data (calling number and called number). An interface may involve no conditions or conditions may be imposed from the called number (format selection), the calling number, or both. Accordingly, effective control may be imposed depending upon the service requested as manifest by an individual format, the instant time, the history of use and the demographics involved. The imposed limitations may be non-existent or may involve a relatively complex test pattern as explained in detail above.

In the disclosed embodiment, an effective record of calls is accumulated in the recent history storage 98. Thus, a composite and detailed record is accumulated of individual calls as executed.

It is to be appreciated that numerous formats may be implemented and controlled utilizing the principles of the system as illustrated above. Accordingly, it is to be understood that the system of the present invention should be interpreted in accordance with the claims as set forth below.

What is claimed is:

1. An interface control system for use with, (1) a communication facility including remote terminals for individual callers to make calls, wherein said remote terminals comprise a telephone capability including voice communication means and some of said remote terminals comprise digital input means for providing data, (2) a multiple port, multiple format processor for concurrently processing data from a substantial number of callers in any one of a plurality of formats, said communication facility automatically providing call data signals, as to indicate called data (DNIS), to select a specific format from said plurality of formats, and (3) a plurality of live operator attended terminals, for a plurality of formats, said interface control system comprising:

call data means for receiving call data signals from said communication facility for a calling remote terminal indicative of calling number identification signals automatically provided by said communication facility and call data signals to indicate called data (DNIS) to select a specific format from said plurality of formats;

interface means for providing automated voice messages relating to said specific format to certain of said individual callers, wherein said certain of said individual callers digitally enter data, including at least caller information data, through said digital input means;

means for directly forwarding, under control of said specific format, a call coupled to said interface means from any one of said remote terminals to one of said plurality of live operator attended terminals for inputting of caller identification data and caller information data when said remote terminals do not have capability to digitally provide data;

qualification means coupled to said live operator attended terminals for controlling access by at least certain of said callers to at least a portion of said system, said qualification being based at least in part on caller identification data entered through said digital input means by at least certain of said callers having digital input means and at said live operator attended terminal when said remote terminals do not have capability to digitally provide data, means for processing coupled to said live operator attended terminals for processing caller information data entered by an operator at said live operator attended terminal; and means for storing coupled to said interface means and said processing means for storing certain select data from said caller information data entered by said operator and data entered digitally by said individual callers to update records on said individual callers.

2. An interface control system according to claim 1, wherein said call data signals automatically provided from said communication facility for a calling remote terminal indicative of calling number identification signals are used to access a positive file of data with respect to said individual callers stored in said means for storing.

3. An interface control system according to claim 2, wherein said access is subject to a use history test.

4. An interface control system according to claim 1, wherein said call data signals automatically provided from said communication facility for a calling remote terminal indicative of calling number identification signals are used to access a negative file to test for prohibited use status with respect to individual callers.

5. An interface control system according to claim 1, wherein said calling number identification signals at least in part control processing of said data entered through said digital input means by said individual callers.

6. An interface control system according to claim 1, wherein said calling number identification signals are used to test for a limit on use with respect to said individual callers.

7. An interface control system according to claim 6, wherein said limit on use is a use history test.

8. An interface control system according to claim 7, wherein said use history test is based on a limited dollar amount.

9. An interface controls system according to claim 7, wherein said use history test is based on a limited dollar amount for a limited period of time.

10. An interface control system according to claim 7, wherein said use history test is based on a limited number of accesses.

11. An interface control system according to claim 7, wherein said use history test is based on a limited number of accesses during a limited period of time.

12. An interface control system according to claim 1, wherein said qualification means controls access at least in part based upon said call data signals.

13. An interface control system according to claim 12, wherein said call data signals include said calling number identification signals.

14. An interface control system according to claim 13, wherein said calling number identification signals include Automatic Number Identification (ANI).

15. An interface control system according to claim 1, wherein said qualification means controls access at least in part based upon said digitally entered data entered by said caller.

16. An interface control system according to claim 1, wherein said qualification means controls access at least in part based upon data entered by an operator.

17. An interface control system according to claim 16, wherein said data entered by a operator is subject to a use history test.

18. An interface control system according to claim 17, wherein said use history test is based on a limited dollar amount.

19. An interface controls system according to claim 17, wherein said use history test is based on a limited dollar amount for a limited period of time.

20. An interface control system according to claim 17, wherein said use history test is based on a limited number of accesses.

21. An interface control system according to claim 17, wherein said use history test is based on a limited number of accesses during a limited period of time.

22. An interface control system according to claim 1, wherein said means for storing further receives and stores said calling number identification signals.

23. An interface control system according to claim 22, wherein said calling number identification signals control at least a part of the operation of the system.

24. An interface control system according to claim 1, further including means for transferring certain of said calls from said live operators to an automated system to receive processed data via a voice generator.

25. An interface control system according to claim 1, wherein said qualification means controls access at least in part based upon said digitally entered data entered by said caller when said remote terminals do have capability to digitally provide data and upon said data entered by said operator when said remote terminals do not have capability to digitally provide data.

26. An interface control system according to claim 25, wherein said qualification means controls access for a predetermined period of time.

27. An interface control system according to claim 25, further including means for transferring certain of said calls from said line operators to the interface means to receive processed data via a voice generator.

28. An interface control system according to claim 25, wherein said calling number identification signals control at least in part the processing of data.

29. An interface control system according to claim 28, wherein said control includes a use history test.

30. An interface control system according to claim 29, wherein said use history test includes a dollar limit.

31. An interface control system according to claim 29, wherein said use history test includes a dollar limit and a limit to a predetermined period of time.

32. An interface control system according to claim 1, wherein said plurality of formats includes a plurality of sales formats.

33. An interface control system for use with, (1) a communication facility including remote terminals for individual callers to make calls, wherein said remote terminals comprise a telephone capability including voice communication means and some of said remote terminals comprise digital input means for providing data, (2) a multiple port, multiple format processor for concurrently processing data from a substantial number of callers in any of a plurality of formats, said communication facility automatically providing call data signals, as to indicate called data (DNIS), to select a specific format from said plurality of formats, and (3) a plurality of live operator attended terminals, for a plurality of formats, said interface control system comprising:

interface means for receiving calling number identification signals and called data (DNIS) signals automatically provided from said communication facility, and for providing automated voice messages relating to a specific format to certain of said individual callers, wherein said certain of said individual callers digitally enter data through said digital input means;

means for directly forwarding a call coupled to said interface means from any one of said remote terminals to one of said plurality of live operator attended terminals under control of said call data signals when said remote terminals do not have capability to digitally provide data;

qualification means coupled to said live operator attended terminals for controlling access by at least certain of said callers to at least a portion of said system, said qualification being based at least in part on caller identification data entered through said digital input means by at least certain of said callers having digital input means and at said live operator attended terminal when said remote terminals do not have capability to digitally provide data, means for processing coupled to said live operator attended terminals for processing caller information data entered by an operator at said live operator attended terminal; and means for storing coupled to said interface means and said processing means for storing certain select data from said caller information data entered by said operator and data entered digitally by said individual callers to update records on said individual callers.

34. An interface control system according to claim 33, wherein said calling number identification signals are used to access a positive file of data relating to said individual callers.

35. An interface control system according to claim 34, wherein said system further includes a use history test for said individual callers.

36. An interface control system according to claim 35, wherein said use history test is based on dollar amount.

37. An interface control system according to claim 35, wherein said use history test is based on number of uses.

38. An interface control system according to claim 33, wherein said calling number identification signals are used to access a negative file and test for prohibited use status relating to said individual callers.

39. An interface control system according to claim 33, wherein said calling number identification signals at least in part control processing of said data entered through said digital input means by said certain individual callers.

40. An interface control system according to claim 33, wherein said calling number identification signals are used to test for a limit on use with respect to said individual callers.

41. An interface control system according to claim 40, wherein said limit on use is based on time.

42. An interface control system according to claim 40, wherein said limit on use includes a use history test.

43. An interface control system according to claim 42, wherein said use history test limits based on dollar amount.

44. An interface control system according to claim 43, wherein said use history test limits based on a dollar amount for a predetermined period of time.

45. An interface control system according to claim 42, wherein said use history test limits based on number of uses.

46. An interface control system according to claim 45, wherein said use history test limits based on a number of uses during a predetermined period of time.

47. An interface control system according to claim 33, wherein said qualification means controls at least in part based upon said digitally entered data entered by said caller when said remote terminals do have capability to digitally provide data and upon data entered by an operator when said remote terminals do not have the capability to digitally provide data.

48. An interface control system according to claim 33, wherein said calling number identification signals control at least in part the processing of said data.

49. An interface control system according to claim 33, wherein said qualification means controls access for a dollar amount for a predetermined period of time.

50. An interface control system according to claim 33, wherein said plurality of formats includes a plurality of sales formats.

51. An interface control system according to claim 33, wherein said qualification means controls access at least in part based upon said call data signals.

52. An interface control system according to claim 51, wherein said call data signals include said calling number identification signals.

53. An interface control system according to claim 52, wherein said calling number identification signals include Automatic Number Identification (ANI).

54. An interface control system according to claim 33, wherein said qualification means controls access at least in part based upon said digitally entered data entered by said caller.

55. An interface control system according to claim 33, wherein said qualification means controls access at least in part based upon data entered by an operator.

56. An interface control system according to claim 33, wherein said means for storing stores said calling number identification signals.

57. An interface control system according to claim 33, wherein said calling number identification signals control at least a part of the operation of the system.

58. An interface control system according to claim 33, further including means for transferring certain of said calls from said live operators to the interface means to receive processed data via a voice generator.

59. An interface and process control system of a multiple port, multiple format processor for concurrently processing data from a substantial number of callers in one of a plurality of formats for use with a telephonic communication facility including remote terminals for individual callers, wherein said remote terminals comprise a telephone capability including voice communication means and digital input means for providing data, said interface and process control system comprising:

call data means for receiving signal-represented call data from said remote terminals indicative of called number identification signals (DNIS) automatically provided by said telephonic communication facility;

selection means coupled to said call data means for selecting a select data format from said plurality of formats under control of said signal-represented call data indicative of called DNIS, said select data format having an imposed condition to execute certain operations of said select data format, one of said formats having an imposed condition for verifying an instant call from a remote terminal against a file to limit or prevent access in accordance with said DNIS signals to said one format from callers listed on said file and at least one of said plurality of formats having an imposed condition with respect to time in accordance with said DNIS signals;

test means coupled to said selection means for testing said imposed condition to provide approval signals; and processing means coupled to said test means for executing certain operations of said select format under control of said approval signals.

60. An interface control system according to claim 59, wherein said file is a negative file and wherein said call data means also receives calling number identification signals automatically provided by said telephonic communication facility, which are used to access said file.

61. An interface control system according to claim 60, wherein said negative file limits access based on a use history test.

62. An interface control system according to claim 61, wherein said use history test is a dollar test.

63. An interface control system according to claim 62, wherein said use history test is a dollar test for a predetermined period of time.

64. An interface control system according to claim 61, wherein said use history test is based on the number of accesses.

65. An interface control system according to claim 64, wherein said use history test is based on the number of accesses for a predetermined period of time.

66. An interface and process control system according to claim 59, wherein said processing means performs certain preliminary processing operations before testing of said imposed condition.

67. An interface control system according to claim 59, wherein said plurality of formats includes a plurality of sales formats.

68. An interface control system for use with, (1) a communication facility including remote terminals for individual callers to make calls, wherein said remote terminals comprise a telephonic instrument including voice communication means and some of said remote terminals comprise digital input means for providing data, and (2) a multiple port, multiple format processor for concurrently processing data from a substantial number of callers in any of a plurality of formats, said communication facility automatically providing call data signals, as to indicate called data (DNIS), to select a particular format from said plurality of formats, and (3) a plurality of live operator attended terminals, for a plurality of formats, said interface control system comprising:

call data means for receiving signal-represented call data from said remote terminals indicative of called number identification signals (DNIS) automatically provided by said telephonic communication facility;

interface means for providing automated voice messages relating to a specific format to certain of said individual callers, wherein said certain of said individual callers digitally enter data through said digital input means;

means for directly forwarding certain of said calls coupled to said interface means from any one of said remote terminals to one of said plurality of live operator attended terminals under control of said call data signals when necessary;

qualification means for controlling access by at least certain of said callers to at least a portion of said system, means for processing coupled to said live operator attended terminals for processing caller information data entered by an operator at said live operator attended terminal; and means for transferring certain of said calls from said live operators to said interface means to receive processed data via a voice generator.

69. An interface control system according to claim 68, wherein said call data means further receives calling number identification signals automatically provided by said telephonic communication facility.

70. An interface control system according to claim 69, wherein said means for processing controls processing of said caller information data based at least in part on said calling number identification signals.

71. An interface control system according to claim 69, wherein said qualification means operates at least in part on said calling number identification signals.

72. An interface control system according to claim 71, wherein said system further includes a use history test for said individual callers.

73. An interface control system according to claim 72, wherein said use history test is based on dollar amount.

74. An interface control system according to claim 72, wherein said use history test is based on number of uses.

75. An interface control system according to claim 74, wherein said use history test is based on the number of accesses for a predetermined period of time.

76. An interface control system according to claim 68, wherein said means for processing also processes said data entered by said certain of said individual callers through said digital input means to control certain operations based on a limit on use.

77. An interface control system according to claim 76, wherein said system further includes a use history test for said individual callers.

78. An interface control system according to claim 77, wherein said use history test is based on dollar amount.

79. An interface control system according to claim 78, wherein said use history test is a dollar test for a predetermined period of time.

80. An interface control system according to claim 77, wherein said use history test is based on number of uses.

81. An interface control system according to claim 80, wherein said use history test is based on a number of uses for a predetermined period of time.

82. An interface control system according to claim 68, wherein said plurality of formats includes a plurality of sales formats.

83. An interface control system according to claim 68, wherein said qualification means controls access at least in part based upon said call data signals.

84. An interface control system according to claim 83, wherein said call data signals include said calling number identification signals.

85. An interface control system according to claim 84, wherein said calling number identification signals include Automatic Number Identification (ANI).

86. An interface control system according to claim 68, wherein said qualification means controls access at least in part based upon said digitally entered data entered by said caller.

87. An interface control system according to claim 68, wherein said qualification means controls access at least in part based upon data entered by an operator.

88. An interface control system according to claim 68, wherein said means for storing stores said calling number identification signals.

89. An interface control system according to claim 88, wherein said calling number identification signals control at least a part of the operation of the system.

* * * * *